(12) United States Patent
Morimoto et al.

(10) Patent No.: US 6,344,982 B1
(45) Date of Patent: Feb. 5, 2002

(54) POWER SUPPLY CIRCUIT

(75) Inventors: Sadao Morimoto, Hyogo; Toshikazu Nagaki, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/647,643

(22) PCT Filed: Feb. 2, 2000

(86) PCT No.: PCT/JP00/00548
§ 371 Date: Nov. 29, 2000
§ 102(e) Date: Nov. 29, 2000

(87) PCT Pub. No.: WO00/46982
PCT Pub. Date: Aug. 10, 2000

(30) Foreign Application Priority Data

| Feb. 4, 1999 | (JP) | 11-027567 |
| Feb. 4, 1999 | (JP) | 11-027568 |
| Feb. 4, 1999 | (JP) | 11-027570 |

(51) Int. Cl.$^7$ .................. H02M 3/335; H02M 7/122
(52) U.S. Cl. .............. 363/21.04; 363/56.09; 363/56.12
(58) Field of Search .................. 363/16, 20, 21.01, 363/21.04, 21.08, 21.09, 56.01, 56.09, 56.11, 56.12, 97, 131

(56) References Cited

U.S. PATENT DOCUMENTS

| 4,968,106 A | * | 11/1990 | Ikeuchi et al. | 315/411 |
| 5,448,465 A | * | 9/1995 | Yoshida et al. | 363/15 |
| 5,455,757 A | | 10/1995 | Nguyen et al. | |
| 5,598,324 A | * | 1/1997 | Imamura et al. | 363/21 |
| 5,883,794 A | * | 3/1999 | Takahashi et al. | 363/21 |
| 5,901,051 A | * | 5/1999 | Takahashi et al. | 363/21 |
| 5,995,385 A | * | 11/1999 | Shimamura | 363/21 |

FOREIGN PATENT DOCUMENTS

| EP | 0 851 672 | 7/1998 |
| JP | 3-273863 | 12/1991 |
| JP | 6-335245 | 12/1994 |
| JP | 7-222021 | 8/1995 |
| JP | 7-288709 | 10/1995 |
| JP | 8-172544 | 7/1996 |

* cited by examiner

Primary Examiner—Matthew Nguyen
(74) Attorney, Agent, or Firm—Ratner & Prestia

(57) ABSTRACT

A power supply circuit employed in various types of electronic appliances, telecommunications equipment, and the like, is provided for generating a voltage pulse by resonance effect of a primary side of a transformer, and outputting the voltage pulse from a secondary side after raising a voltage thereof. The power supply suppresses fluctuations of electric current, and prevents noise from being propagated through a device powered by the supply. A control circuit actuates a second switching element into a non-conducting state while a first switching element is in a conducting state. The power supply switches the second switching element into a conducting state when voltage of a primary coil is greater than voltage of a driving power supply after an electric current flows in a first diode while the first switching element is in a non-conducting state.

8 Claims, 17 Drawing Sheets

US 6,344,982 B1

POWER SUPPLY CIRCUIT

THIS APPLICATION IS A U.S. NATIONAL PHASE APPLICATION OF PCT INTERNATIONAL APPLICATION PCT/JP00/00548.

FIELD OF THE INVENTION

The present invention relates to a power supply circuit employed in a various kind of electronic appliances, telecommunications equipment, and the like, for generating a voltage pulse by resonance effect of a primary side of transformer, and outputting the voltage pulse from a secondary side after raising a potential thereof.

BACKGROUND OF THE INVENTION

With reference to accompanying figures, a power supply circuit of the prior art will be described hereafter.

FIG. 16 represents a circuit diagram illustrating a power supply circuit of the prior art, and FIG. 17 is a drawing of waveforms showing changes in voltage, current, and switch pulse in the power supply circuit with time.

The power supply circuit of the prior art shown in FIG. 16 is intended to stabilize an output voltage of high potential applied by a transformer to a display. Its composition has been such that it comprises a driving power supply 403 connected to one side of terminals of a primary coil 402 of the transformer 401, and a switching element 404, a capacitor 405 and a diode 406 connected to the other side of the terminals of the primary coil 402.

The switching element 404 is comprised of a MOS type field-effect transistor (MOS FET) that has an internal diode. This MOS type field-effect transistor is disposed in a manner that a drain is connected to the other side terminal of the primary coil 402, a source is connected to a ground side, and a gate is connected to a PWM control circuit 407, which generates a pulse wave for controlling the switching element 404. It contains the internal diode with its anode connected to the ground side, and a cathode to the other side terminal of the primary coil 402. The capacitor 405 has its one end connected to the other side terminal of the primary coil 402, and the other end connected to the ground side. The diode 406 has its cathode connected to the other side terminal of the primary coil 402, and anode connected to the ground side. In addition, the cathode of the diode 406 and the one end of the capacitor 405 are connected to a point where the drain of the switching element 404 and the primary coil 402 make connection.

A display 409 (CRT) having high horizontal and vertical scanning frequency is connected to a secondary coil 408 of the transformer 401.

Furthermore, waveforms of voltage, current and switch pulse in this power supply circuit, as they change with a lapse of time are shown in FIG. 17.

In FIG. 17, a reference letter (a) represents a waveform illustrating a time series of change in value of voltage induced in the primary coil 402 of the transformer 401 taken at a point "O" in the power supply circuit; a letter (b) a waveform illustrating a time series of change in amount of current flowing at the point "O" in the power supply circuit; and a letter (c) a waveform illustrating a time series of change in shape of an output wave of the PWM control circuit fed to the switching element 404.

During a period of A to B in FIG. 17, when a pulse wave (the output wave) of a predetermined duration shown by the waveform (c) is input from the PWM control circuit 407 to the switching element 404, making the switching element 404 into an ON state, amount of electric current in the point "O" increases with time in proportion to a duration of the ON state of the switching element 404 as shown by the waveform (b), and thereby energy is charged into the primary coil 402.

During a period of B to C, when input of the pulse wave from the PWM control circuit 407 to the switching element 404 is ceased, as shown by the waveform (c), to turn the switching element 404 into an OFF state, the energy charged in the primary coil 402 begins to be charged into the capacitor 405, and amount of the current in the point "O" decreases with time, as shown by the waveform (b). The voltage of the primary coil 402 reaches its peak value as shown by the waveform (a), upon completion of the charge.

During a period of C to D, after completion of the charge into the capacitor 405, the energy charged in the capacitor 405 begins to be recharged into the primary coil 402 again, and amount of the current in the point "O" decreases with time, as shown by the waveform (b). The voltage of the primary coil 402 becomes zero as shown by the waveform (a), when the charge is completed.

During a period of D to E, when the charge to the primary coil 402 is completed, the energy charged in the primary coil 402 is about to start being recharged into the capacitor 405 again, and this recharge of the capacitor 405 is to begin through the ground side due to an effect of a positive-negative relation in polarity of the voltage across the primary coil 402. However, the capacitor 405 is not charged, but a current flows through the diode 406 having a low impedance, since the diode 406 is placed between the other side terminal of the primary coil 402 and the ground with the anode connected to the ground side. Therefore, although amount of the current flowing in the point "O" increases with time as shown by the waveform (b), the voltage of the primary coil 402 remains zero as shown by the waveform (a), since no energy is charged into the capacitor 405.

During a period of E to F, since the energy charged in the primary coil 402 has been discharged by the flow of current through the diode 406, amount of the current shown by the waveform (b) in the point "O" shall now remain theoretically zero, unless the switching element 404 is turned into an ON state with the waveform (c). In reality, however, amount of the current through the point "O" increases for a certain period of time as shown by the waveform (b).

A certain amount of energy is therefore charged in the primary coil 402 due to the increase of current through the point "O".

Subsequently, during a period of F to G, the energy charged into the primary coil 402 begins to be charged to the capacitor 405 in the same manner as above, after the charge to the primary coil 402 is completed. Thus, amount of the current in the point "O" decreases with time, as shown by the waveform (b), and voltage of the primary coil 402 reaches its peak value as shown by the waveform (a), when the charge is completed.

During a period of G to H, after completion of the charge into the capacitor 405, the energy charged in the capacitor 405 begins to be recharged into the primary coil 402 again, and amount of the current in the point "O" decreases with time, as shown by the waveform (b). The voltage of the primary coil 402 becomes zero as shown by the waveform (a), when the charge is completed.

During a period of H to I, when the charge into the primary coil 402 is completed, the energy charged in the primary coil 402 is about to start being recharged into the capacitor 405 again. While amount of the current flowing in the point "O" increases with time as shown by the waveform (b), the voltage of the primary coil 402 remains zero as shown by the waveform (a), since no energy is charged into the capacitor 405.

During a period of I to J, amount of the current in the point "O" again increases for a certain period of time in the same manner as described above, as shown by the (b), and energy is hence charged in the primary coil 402.

During a period of J to K (A), after the charge to the primary coil 402 is completed, the energy charged in the primary coil 402 begins to be charged into the capacitor 405. Amount of the current in the point "O" decreases with time, as shown by the waveform (b), and the voltage of the primary coil 402 reaches its peak value as shown by the waveform (a), when the charge is completed. Since the switching element 404 is turned into an ON state during this period, as shown by the waveform (c), this becomes a new starting point and the same steps as above are repeated over again.

In the above composition, an output voltage of the secondary coil 408 changes depending on value of the voltage of the primary coil 402. The voltage of the primary coil 402 varies depending on a duration of time in the ON state of the switching element 404, and the longer the ON state, the greater the voltage.

As the pulse wave of the predetermined duration is input to the switching element 404 from the PWM control circuit 407 during this step, the voltage of the primary coil 402 becomes zero instantly at a timing the pulse wave goes on. Due to this sudden change in value of the voltage, amount of the current in the point "O" increases while producing undulation (W) shown by the waveform (b) in FIG. 17 during the ON state of the switching element 404. It has a substantial effect, especially if the voltage of the primary coil 402 changes to zero from a value greater than a voltage of the driving power supply in the timing the pulse wave turns on.

As has been described, there has been a problem with the above composition in that noises are generated on an display screen due to an influence of the undulation (W) in the current.

DISCLOSURE OF THE INVENTION

An object of the present invention is to provide a power supply circuit that suppresses undulation in current, and prevents screen noises from being generated on a display, for instance, when it is used as a load.

In order to achieve this object, the present invention provides a composition comprising;

a driving power supply connected to one side of terminals of a primary coil of transformer, a first switching element, a capacitor, and a first diode, all connected to the other side of the terminals of the primary coil.

The first switching element is comprised of a first MOS type field-effect transistor (MOS FET) having a drain connected to the other side terminal of the primary coil, a source connected to a ground side, and a gate connected to a control circuit.

The capacitor has its one end connected to the other side terminal of the primary coil, and the other end connected to the ground side.

The first diode has its cathode connected to the other side terminal of the primary coil, and an anode connected to the ground side.

In addition, there is provided a noise suppression means between the transformer and the control circuit to restrict generation of noises.

With the composition as described above, generation of noises can be restricted.

DESCRIPTION OF THE PREFERRED EMBODIMENTS

First Exemplary Embodiment

With reference to accompanying figures, a power supply circuit of a first exemplary embodiment of this invention will be described hereinafter.

Figure 1:
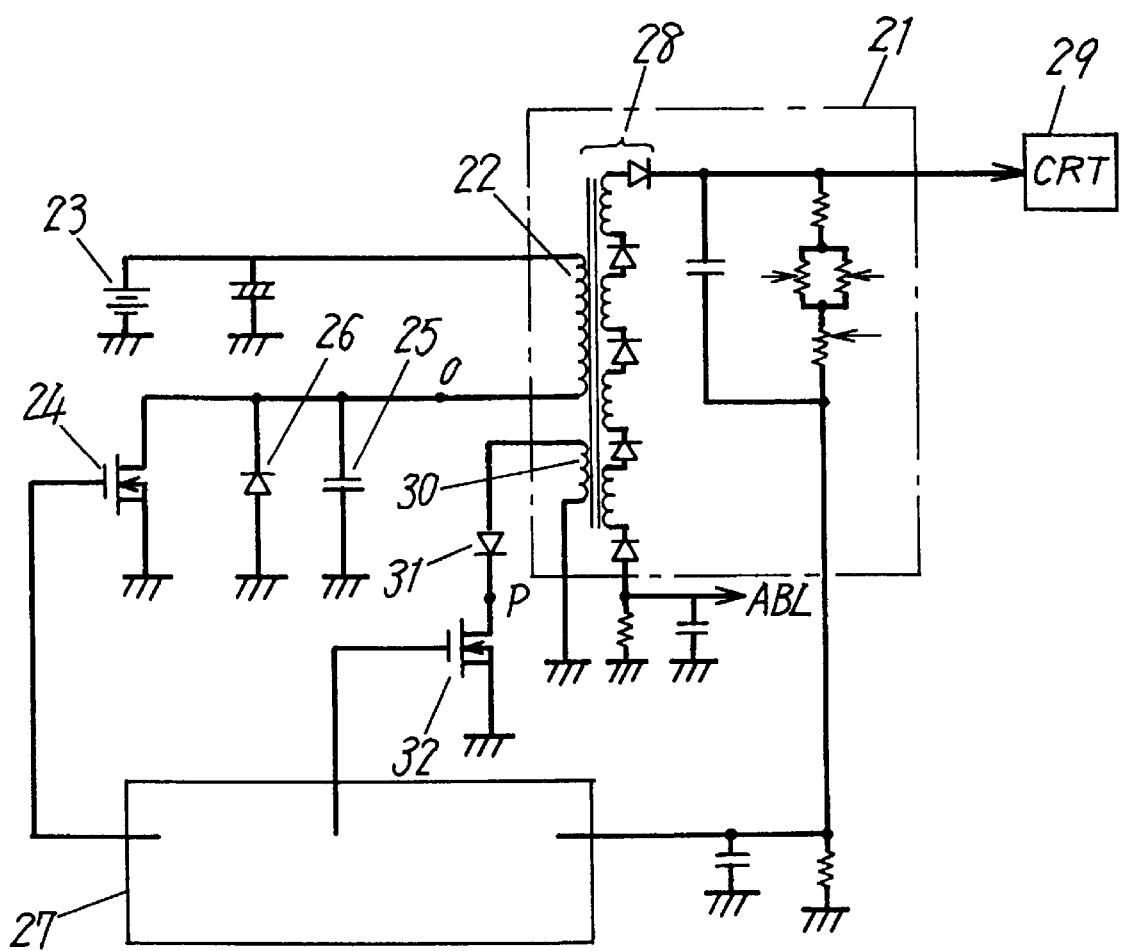
FIG. 1 is a circuit diagram illustrating a power supply circuit of a first exemplary embodiment of the present invention.

In FIG. 1, the power supply circuit of the first exemplary embodiment of this invention comprises a driving power supply 23 connected to one end of terminals of a primary coil 22 of a transformer 21, a first switching element 24, a capacitor 25, and a first diode 26, all connected to the other end of the terminals of the primary coil 22.

Furthermore, the first switching element 24 is comprised of a first MOS type field-effect transistor (MOS FET) that has an internal diode. This first MOS type field-effect transistor is disposed in a manner that a drain is connected to the other side terminal of the primary coil 22, a source is connected to a ground side, and a gate is connected to a PWM type control circuit 27, which generates a pulse wave to control the first switching element 24. It contains the internal diode with an anode connected to the ground side, and a cathode to the other side terminal of the primary coil 22. The capacitor 25 has its one end connected to the other side terminal of the primary coil 22, and the other end connected to the ground side. The first diode 26 has its cathode connected to the other side terminal of the primary coil 22, and an anode connected to the ground side. In addition, the cathode of the first diode 26 and the one end of the capacitor 25 are connected to a point where the drain of the first MOS type field-effect transistor and the primary coil 22 make connection.

There is also provided with an auxiliary coil 30, which is mutually inductive with the primary coil 22, with one of terminals connected to the ground side. In addition, a second diode 31 and a second switching element 32 are disposed in connection to the other side of the terminals of the auxiliary coil 30. The second diode 31 and the second switching element 32 compose a noise suppression means. The second switching element 32 is comprised of a second MOS type field-effect transistor having a drain connected to the other side terminal of the auxiliary coil 30 through the second diode 31, a source connected to the ground side, and a gate connected to the PWM type control circuit 27. The second diode 31 has an anode connected to the other side terminal of the auxiliary coil 30, and a cathode connected to the drain side of the second MOS type field-effect transistor. The control circuit 27 is so designed as to switch the second switching element 32 into an OFF state while the first switching element 24 is in its ON state, and into an ON state when voltage of the primary coil 22 is greater in value than voltage of the driving power supply after an electric current flows in the first diode 26 while the first switching element 24 is in its OFF state.

A display 29 (CRT) having high horizontal and vertical scanning frequency, or the like, is connected to an output side of a secondary coil 28.

Figure 2:
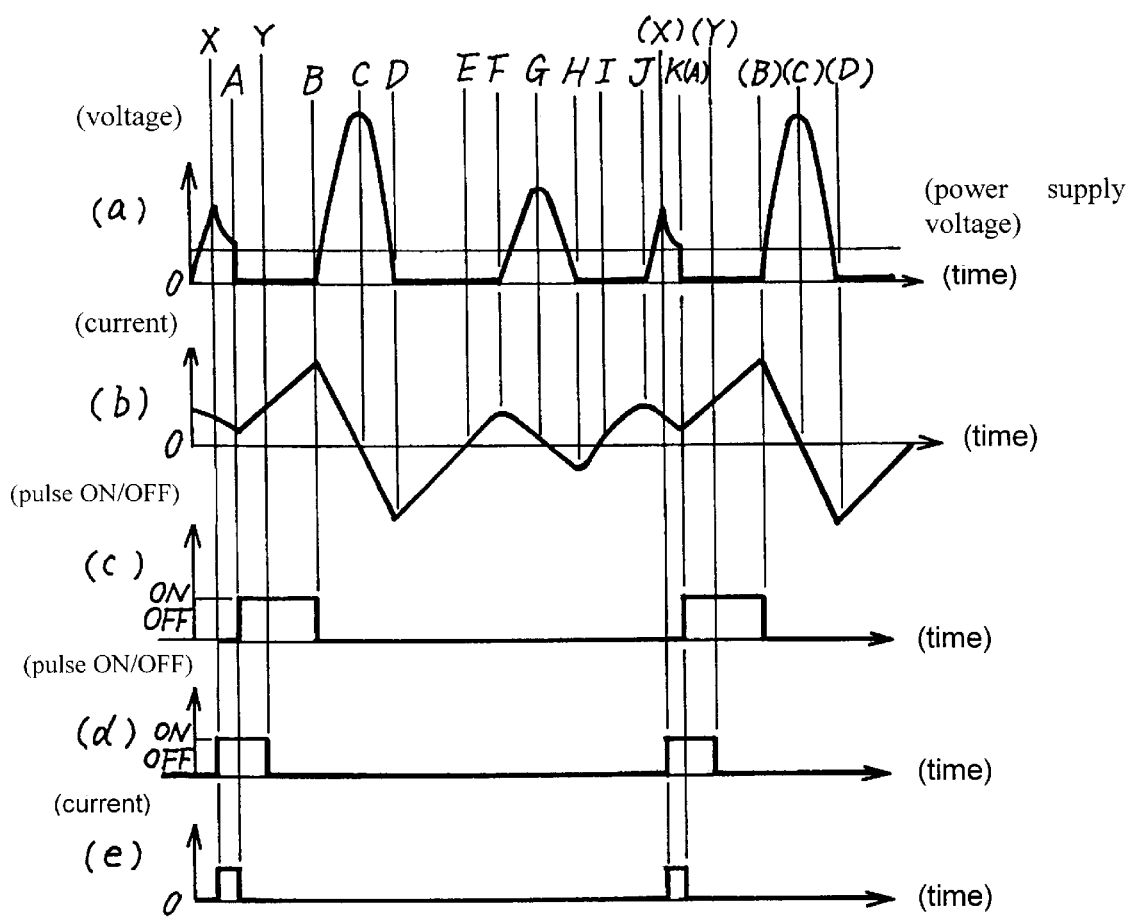
FIG. 2 is a drawing of waveforms showing time series of changes in voltage, current, and switch pulse in the same power supply circuit.

In this power supply circuit, waveforms of voltage, current and switch pulses, as they change with a lapse of time, are shown in FIG. 2.

In FIG. 2, a reference letter (a) represents a waveform illustrating a time series of change in value of voltage induced in the primary coil 22 of the transformer 21 taken at a point "O" in the power supply circuit of FIG. 1; a letter (b) a waveform illustrating a time series of change in amount of current flowing in the point "O" in the power supply circuit ; a letter (c) a waveform illustrating a time series of change in shape of an output wave of the control circuit 27 fed to the first switching element 24, a letter (d) a waveform illustrating a time series of change in shape of an output wave of the control circuit 27 fed to the second switching element 32; and a letter (e) a waveform illustrating a time series of change in amount of current flowing through a point "P" in the power supply circuit of FIG. 1.

During a period of A to B in FIG. 2, when a pulse wave (the output wave) of a predetermined duration shown by the waveform (c) is input from the control circuit 27 to the first switching element 24, making the first switching element 24 into an ON state, amount of electric current in the point "O" in FIG. 1 increases with time in proportion to a duration of the ON state of the first switching element 24 as shown by the waveform (b), and thereby energy is charged into the primary coil 22.

During a period of B to C, when an input of the pulse wave from the control circuit 27 to the first switching element 24 is ceased as shown by the waveform (c), causing the first switching element 24 into an OFF state, the energy charged in the primary coil 22 begins to be charged into the capacitor 25, and amount of the current in the point "O" decreases with time, as shown by the waveform (b). The voltage of the primary coil 22 reaches its peak value as shown by the waveform (a), when the charge is completed.

During a period of C to D, after completion of the charge into the capacitor 25, the energy charged in the capacitor 25 begins to be recharged into the primary coil 22 again, and amount of the current in the point "O" decreases with time, as shown by the waveform (b). The voltage of the primary coil 22 becomes zero as shown by the waveform (a), when the charge is completed.

During a period of D to E, when the charge to the primary coil 22 is completed, the energy charged in the primary coil 22 is about to start being recharged into the capacitor 25 again, and this recharge of the capacitor 25 begins through the ground side due to an effect of a positive-negative relation in polarity of the voltage across the primary coil 22. However, a current flows through the first diode 26 having a low impedance, instead of charging the capacitor 25, since the first diode 26 is disposed between the other side terminal of the primary coil 22 and the ground, with the anode connected to the ground side. Therefore, although amount of the current flowing in the point "O" increases with time as shown by the waveform (b), the voltage of the primary coil 22 remains zero as shown by the waveform (a), since no energy is charged into the capacitor 25.

During a period of E to F, since the energy charged in the primary coil 22 has been discharged by the flow of current through the first diode 26, amount of the current shown by the waveform (b) in the point "O" shall theoretically remain zero, unless the switching element 24 is turned into an ON state with the waveform (c). In reality, however, amount of the current through the point "O" increases for a certain period of time as shown by the waveform (b).

A certain amount of energy is therefore charged in the primary coil 22 due to the increase in amount of the current through the point "O".

During a period of F to G, the energy charged in the primary coil 22 begins to be charged into the capacitor 25 in the same manner as above, after the charge to the primary coil 22 is completed. Thus, amount of the current in the point "O" decreases with time, as shown by the waveform (b), and the voltage of the primary coil 22 reaches its peak. value as shown by the waveform (a), when the charge is completed.

During a period of G to H, after completion of the charge into the capacitor 25, the energy charged in the capacitor 25 begins to be recharged into the primary coil 22 again, and amount of the current in the point "O" decreases with time, as shown by the waveform (b). The voltage of the primary coil 22 becomes zero as shown by the waveform (a), when the charge is completed.

During a period of H to I, when the charge to the primary coil 22 is completed, the energy charged in the primary coil 22 is about to start being recharged into the capacitor 25 again. While amount of the current in the point "O" increases with time as shown by the waveform (b), the voltage of the primary coil 22 remains zero as shown by the waveform (a), since no energy is charged into the capacitor 25.

During a period of I to J, amount of the current in the point "O" again increases for a certain period of time in the same manner as described above, as shown by the waveform (b), and energy is hence charged in the primary coil 22.

During a period of J to K (A), after the charge to the primary coil 22 is completed, the energy charged in the primary coil 22 begins to be charged into the capacitor 25. Amount of the current through the point "O" decreases with time, as shown by the waveform (b), and the voltage of the primary coil 22 reaches its peak value as shown by the waveform (a), when the charge is completed. Since the first switching element 24 is turned into an ON state during this period, as shown by the waveform (c), this becomes a new starting point again.

In addition, the second switching element 32 is so operated that it turns into an ON state when voltage of the primary coil 22 is greater than the voltage level of the driving power supply after an electric current flows in the first diode 26 while the first switching element 24 is in its OFF state (at points X and (X)), and it turns into an OFF state while the first switching element 24 is in its ON state (at points Y and (Y)).

At a time when the second switching element 32 goes into an ON state as shown by the waveform (d), an electric current flows through the point "P" simultaneously, as shown by the waveform (e).

In a period of (A) through (D), same operations as described above are repeated.

Waveforms of (c) and (d) are adjusted in advance of their timings according to a cyclic period of the waveform (a).

With the above-described composition, voltage of the primary coil 22 decreases to the voltage level of the driving power supply at the moment the second switching element 32 is turned on, when the voltage of the primary coil 22 is greater than the voltage of the driving power supply, and the voltage of the primary coil 22 then becomes zero at the moment the first switching element 24 is turned into an ON state, since the second switching element 32 is switched into its ON state when the voltage of the primary coil 22 is greater than the voltage level of the driving power supply after electric current flows in the first diode 26 while the first switching element 24 is in its OFF state (at the points X and (X)).

The voltage of the primary coil 22 decreases gradually to the voltage level of the driving power supply during this moment, because the energy built up in the transformer 21 is gradually discharged, while the auxiliary coil 30 is also short-circuited.

In other words, there is no sudden change in voltage, and undulation liable to occur in the current wave can be restricted, since the voltage always changes from a value equal to or below the voltage of the driving power supply to zero at the moment the first switching element 24 is turned on.

As described above, the first exemplary embodiment of this invention eliminates a sudden change in voltage, and restricts the undulation likely to occur in the current wave, because it always changes the voltage from a value equal to or below the voltage of the driving power supply to zero at the moment the first switching element 24 is turned on.

Second Exemplary Embodiment

Figure 3:
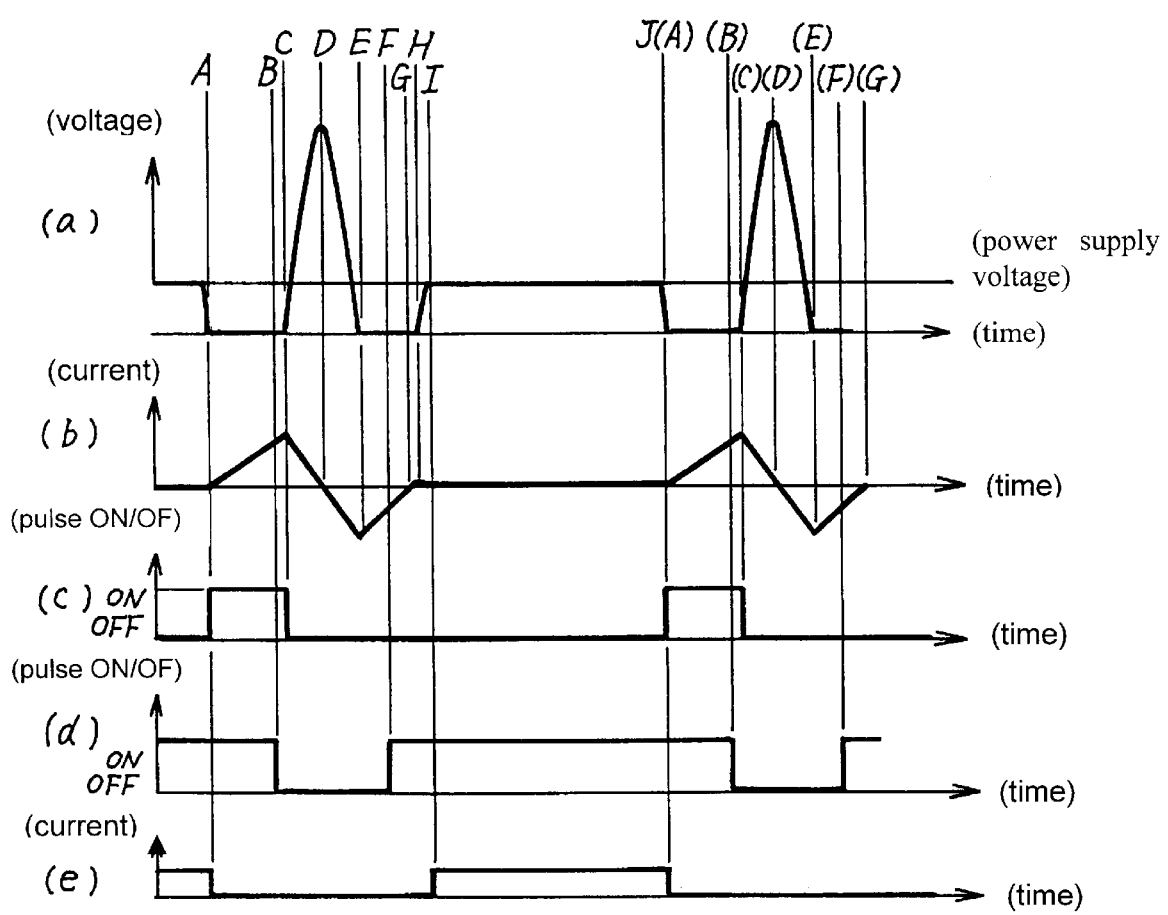
FIG. 3 is a drawing of waveforms showing time series of changes in voltage, current, and switch pulse in a power supply circuit of a second exemplary embodiment of this invention.

Referring now to FIG. 1 and FIG. 3, a power supply circuit of a second exemplary embodiment of this invention will be described hereinafter.

A power supply circuit of the second exemplary embodiment of this invention employs a change in control function of the control circuit 27 in the power supply circuit, shown in FIG. 1, in the first exemplary embodiment of this invention.

A control circuit 27 of the power supply circuit in the second exemplary embodiment of this invention generates a pulse wave to control a first switching element 24 and a second switching element 32 and thereby it switches the second switching element 32 into an OFF state while the first switching element 24 is in an ON state, and into an ON state while an electric current is flowing through a first diode 26.

In this power supply circuit, waveforms of voltage, current and switch pulses, as they change with a lapse of time, are shown in FIG. 3.

In FIG. 3, a reference letter (a) represents a waveform illustrating a time series of change in value of voltage induced in a primary coil 22 of a transformer 21 taken at a point "O" in the power supply circuit; a letter (b) a waveform illustrating a time series of change in amount of current in the point "O" in the power supply circuit; a letter (c) a waveform illustrating a time series of change in shape of an output wave of the control circuit 27 fed to the first switching element 24, a letter (d) a waveform illustrating a time series of change in shape of an output wave of the control circuit 27 fed to the second switching element 32; and letter (e) a waveform illustrating a time series of change in amount of current in a point "P" in the power supply circuit of FIG. 1.

During a period of A to C in FIG. 3, when a pulse wave (the output wave) of a predetermined duration shown by the waveform (c) is input from the control circuit 27 to the first switching element 24 to turn the first switching element 24 into an ON state, amount of electric current through the point "O" increases with time in proportion to a duration of the ON state of the first switching element 24 as shown by the waveform (b), and thereby energy is charged into the primary coil 22. An amount of current in the point "P" remains zero while there is an electric current flowing in the point "O", since no current flows in the point "P".

The pulse wave (output wave) of predetermined duration input to the second switching element 32 from the control circuit 27 is cut off at any given timing of a point "B" during the period of A to C, as shown by the waveform (d), to keep the second switching element 32 in its OFF state.

During a period of C to D, when the first switching element 24 is turned into an OFF state by terminating the input of pulse wave of the control circuit 27 to the first switching element 24, as shown by the waveform (c), the energy charged into the primary coil 22 begins to be charged into the capacitor 25. This causes the amount of current in the point "O" to decrease with time as shown by the waveform (b), and the voltage of the primary coil 22 reaches its peak value as shown by the waveform (a), when the charge is completed.

During a period of D to E, after completion of the charge into the capacitor 25, the energy charged in the capacitor 25 begins to be recharged into the primary coil 22 again, and amount of the current in the point "O" decreases with time, as shown by the waveform (b). The voltage of the primary coil 22 becomes zero as shown by the waveform (a), when the charge is completed.

During a period of E to G, when the charge to the primary coil 22 is completed, the energy charged in the primary coil 22 is about to start being recharged into the capacitor 25 again, and this recharge of the capacitor 25 begins through the ground side due to an effect of a positive-negative relation in polarity of the voltage across the primary coil 22. However, a current flows through the first diode 26 having a low impedance, instead of charging the capacitor 25, since there is the first diode 26 between the other side terminal of the primary coil 22 and the ground, with the anode connected to the ground side. Therefore, although amount of the current in the point "O" increases with time as shown by the waveform (b), the voltage of the primary coil 22 remains zero as shown by the waveform (a), since no energy is charged into the capacitor 25.

The pulse wave (output wave) of a predetermined duration from the control circuit 27 is input to the second switching element 32 at any given timing of a point "F" during the period of E to G, as shown by the waveform (d), to keep the second switching element 32 in its ON state.

During a period of G to H, since the energy charged in the primary coil 22 has been discharged by the flow of current through the first diode 26, amount of the current shown by the waveform (b) in the point "O" shall theoretically remain zero, unless the switching element 24 is turned into an ON state with the waveform (c). In reality, however, amount of the current in the point "O" increases for a certain period of time as shown by the (b).

Although a certain amount of energy is due to be charged in the primary coil 22 with the increase in amount of the current through the point "O", no energy is charged in the primary coil 22, because the second switching element 32 is held in its ON state at the point "F" of given timing during the period of E to G, which turns the auxiliary coil 30 into a short-circuited condition.

This is due generally to the phenomenon involving two coils that are mutually inductive, in which energy is not charged into one of the coils even when electric current flows in it, if the other coil is in a short-circuited condition.

During a period of H to I, no energy is charged in the capacitor 25, since energy is not charged in the primary coil 22. Thus, amount of the current through the point "O" decreases with time to zero, as shown by the waveform (b), and the voltage of the primary coil 22 is kept at same value as the voltage of the driving power supply 23, as shown by the waveform (a).

During a period of I to J(A), when the amount of current becomes zero as shown by the waveform (b), a current begins to flow in the point "P" as shown by the waveform (e), to make the voltage of the primary coil 22 kept at the voltage of the driving power supply, and this continues until there turns into an ON state in the waveform (c).

Subsequently, the same steps are repeated throughout a period of (A) to (G).

With the above-described composition, an electric current, which is a cause of charging energy in the primary coil 22, flows into the primary coil 22, after the first switching element 24 turns into its OFF state from the ON state by the pulse wave generated in the control circuit 27, and the voltage becomes zero as the current flows for the first time in the first diode 26. However, the primary coil 22 can be prevented from being charged with energy, even when the current flows through the primary coil 22.

In an ordinary case, the voltage waveform is liable to be subjected under an L-C resonance with reference to the voltage of the driving power supply 23, after the first current flows through the first diode 26. In the above composition, however, the voltage is maintained constant at the same voltage as the driving power supply 23, which is greater than zero.

Therefore, this composition can reliably produce the voltage across the primary coil 22 of the transformer 21 even for a display 29 having high resolution with high horizontal and vertical scanning frequency, or the like, since it does not allow electric current to flow through the first diode 26 at the second time and thereafter, thereby preventing the phenomenon in that no current flows in the first switching element 24 when the pulse wave is turned into ON state.

The control circuit 27, in particular, is so devised that it switches the second switching element 32 into its ON state while there is an electric current flowing through the first diode 26. Therefore, the primary coil 22 is not actually charged with energy, even if the electric current, a cause of charging energy to the primary coil 22, flows in the primary coil 22, after the voltage becomes zero as the current flows through the first diode 26 for the first time.

Accordingly, since no energy is charged in the primary coil 22 to cause an L-C resonance with reference to the voltage of the driving power supply 23, it prevents the resonance from taking place, thereby maintaining the voltage waveform at the same voltage as the driving power supply 23 after the first electric current flows through the first diode 26.

According to the second exemplary embodiment, as described above, the control circuit 27 switches the second switching element 32 into its ON state while electric current flows through the first diode 26. Therefor, no energy is actually charged in the primary coil 22, even if the electric current, a cause of charging energy to the primary coil 22, flows in the primary coil 22, after the voltage becomes zero due to the first current flowing through the first diode 26. As the result, it prevents a resonance from taking place, thereby maintaining the voltage waveform at the same voltage as the driving power supply 23 after the first electric current flows through the first diode 26, since no energy is charged in the primary coil 22 to cause the L-C resonance with reference to the voltage of the driving power supply 23.

Accordingly, it can prevent the phenomenon in that no current flows in the first switching element 24 when the first switching element 24 is switched into its ON state, and produce the voltage reliably across the primary coil 22 of the transformer, even for the display 29 having high resolution with high horizontal and vertical scanning frequency, or the like.

Third Exemplary Embodiment

A power supply circuit of a third exemplary embodiment of this invention will be described hereinafter with reference to the accompanying figures.

Figure 4:
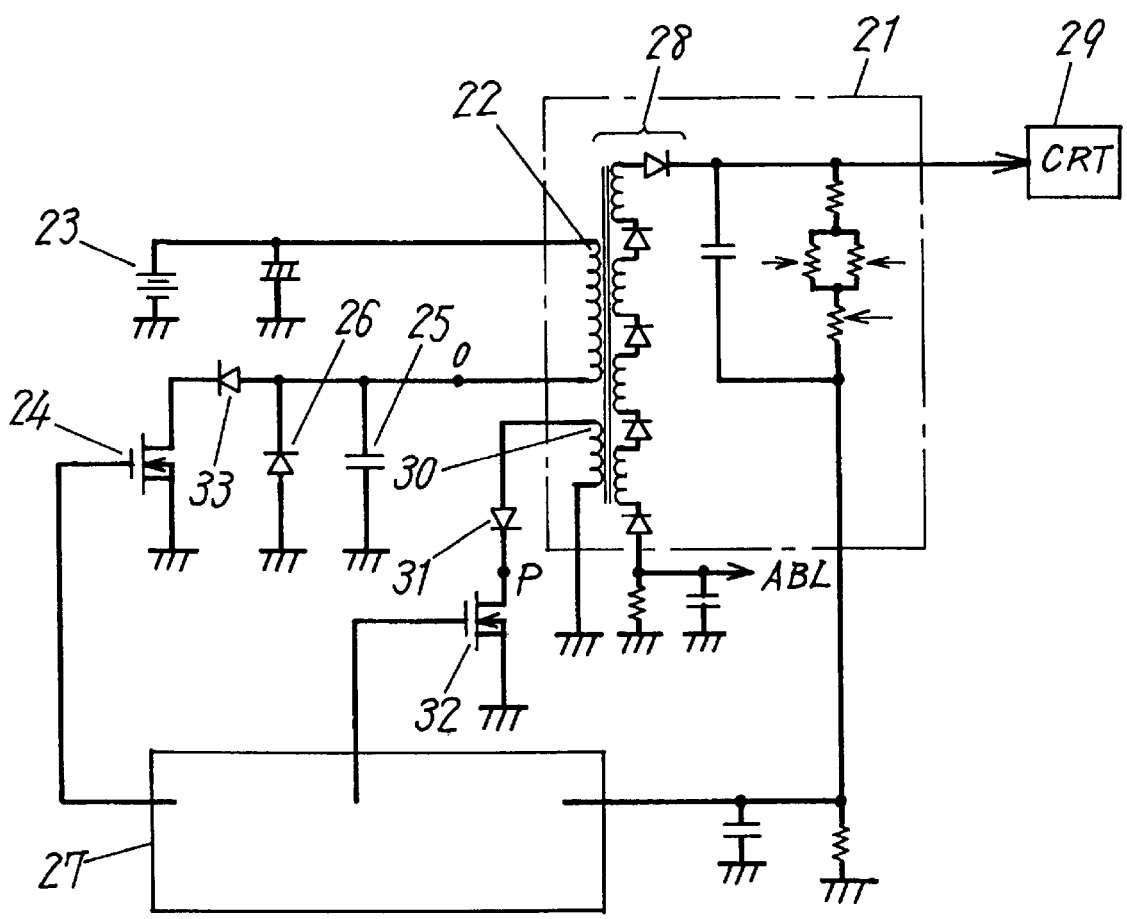
FIG. 4 is a circuit diagram illustrating a power supply circuit of a third exemplary embodiment of this invention.
Figure 5:
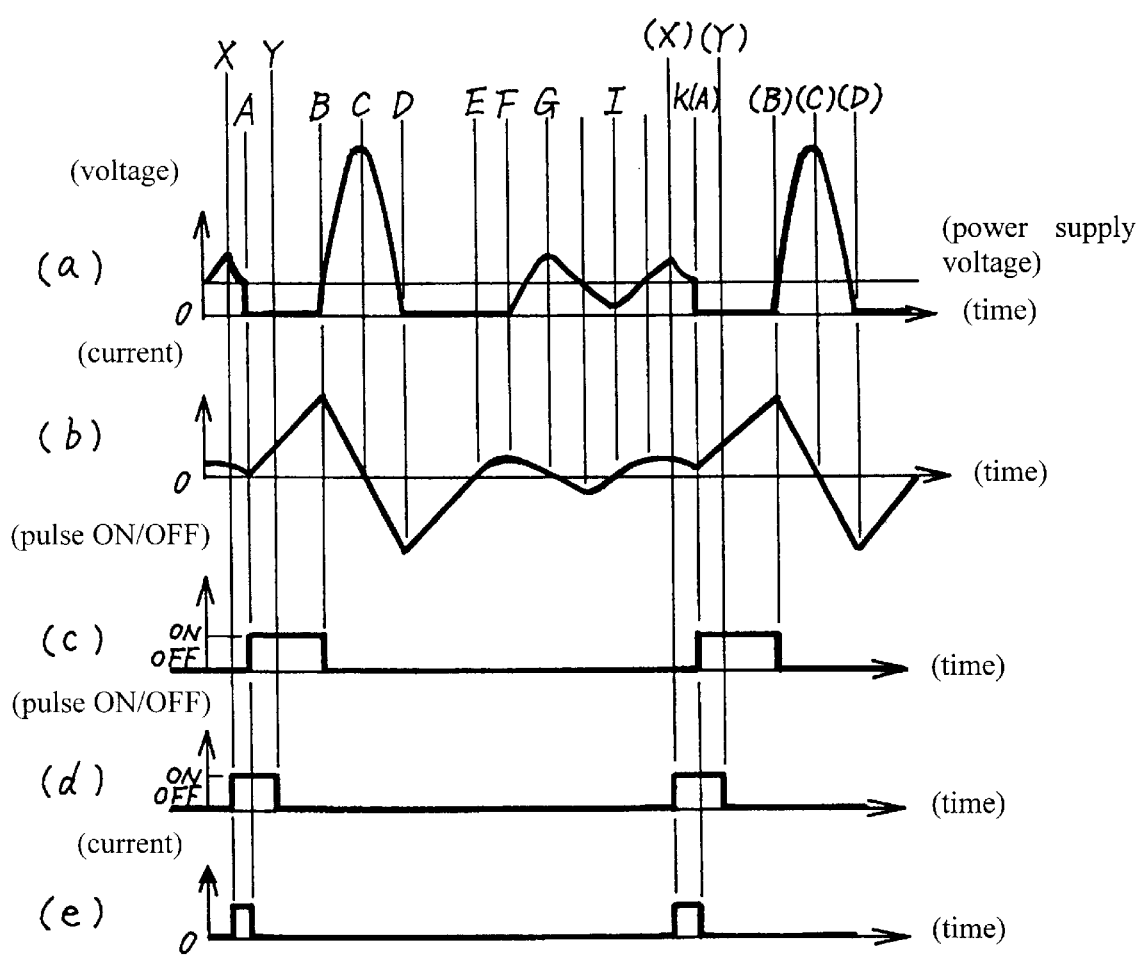
FIG. 5 is a drawing of waveforms showing time series of changes in voltage, current, and switch pulse in the same power supply circuit.

In FIG. 4 and FIG. 5, the power supply circuit for a transformer in the third exemplary embodiment of the present invention is a modified version of the transformer power supply circuit of the first exemplary embodiment of this invention. Therefore, the same structural components are assigned with the same reference numerals.

The power supply circuit of the third exemplary embodiment of this invention has a composition that comprises a third diode 33 provided between a drain of a MOS type field-effect transistor constituting a first switching element 24 and a cathode of a first diode 26, wherein a cathode of the third diode 33 is connected to a drain of the MOS type field-effect transistor serving as the first switching element 24, and an anode of the third diode 33 is connected to the cathode of the first diode 26.

In this power supply circuit, waveforms of voltage, current and switch pulses, as they change with a lapse of time, are shown in FIG. 5.

In FIG. 5, a reference letter (a) represents a waveform illustrating a time series of change in value of voltage induced in a primary coil 22 of a transformer 21 taken at a point "O" in the power supply circuit; a letter (b) a waveform illustrating a time series of change in amount of current in the point "O" of the power supply circuit; a letter (c) a waveform illustrating a time series of change in shape of an output wave of a control circuit 27 fed to the first switching element 24; a letter (d) a waveform illustrating a time series of change in shape of another output wave of the control circuit 27 fed to a second switching element 32; and a letter (e) a waveform illustrating a time series of change in amount of current at a point "P" of the power supply circuit of FIG. 4. Illustration of the waveforms in the third exemplary embodiment is identical to the corresponding illustration in the first exemplary embodiment, except for the waveforms (a) and (b) in a period between E and K(A).

During the period of E through K(A), a voltage shown by the waveform (a) does not become smaller than zero, even though the generated voltage indicates an L-C resonance around a driving power supply voltage, since an addition of the third diode 33 reduces an amount of current produced, as shown by the waveform (b).

Therefore, once an electric current flows through the first diode 26 for the first time, this composition does not allow subsequent current to flow through it at the second time and thereafter, thereby preventing the phenomenon that no current flows in the first switching element 24 when the first switching element 24 is turned into an ON state, as shown by the waveform (c). Hence, it can produce a voltage reliably across the primary coil 22 of the transformer, even for a display 29 having high resolution with high horizontal and vertical scanning frequency, or the like.

Additionally, in the same manner as the power supply circuit of the first exemplary embodiment, the second switching element 32 is so operated that it turns into an ON state when voltage of the primary coil 22 is greater than a voltage level of the driving power supply after an electric current flows in the first diode 26 while the first switching element 24 is in its OFF state (at points X and (X)), and it turns into an OFF state while the first switching element 24 is in its ON state (at points Y and (Y)). Therefore, voltage of the primary coil 22 decreases to the voltage level of the driving power supply at the moment the second switching element 32 is turned on, when the voltage of the primary coil 22 is greater than the voltage of the driving power supply, and that the voltage of the primary coil 22 becomes zero at the moment the first switching element 24 is turned on.

In other words, there is no sudden change in voltage, and undulation liable to occur in the current wave can be restricted, since the voltage always changes from a level equal to or below the voltage of the driving power supply to zero at the moment the first switching element 24 is turned on.

According to the third exemplary embodiment as described, it can prevent the phenomenon in that no current flows in the first switching element 24, and thereby it can produce a voltage reliably across the primary coil 22 of the transformer even for the display 29 having high resolution with high horizontal and vertical scanning frequency, or the like. In addition, since the voltage always changes from a value equal to or below the voltage of the driving power supply to zero at the moment the first switching element 24 is turned on, no sudden change occurs in voltage, and thereby restricting undulation that is liable to occur in the current wave.

Fourth Exemplary Embodiment

A power supply circuit of a fourth exemplary embodiment of this invention will be described hereinafter with reference to the accompanying figures.

Figure 6:
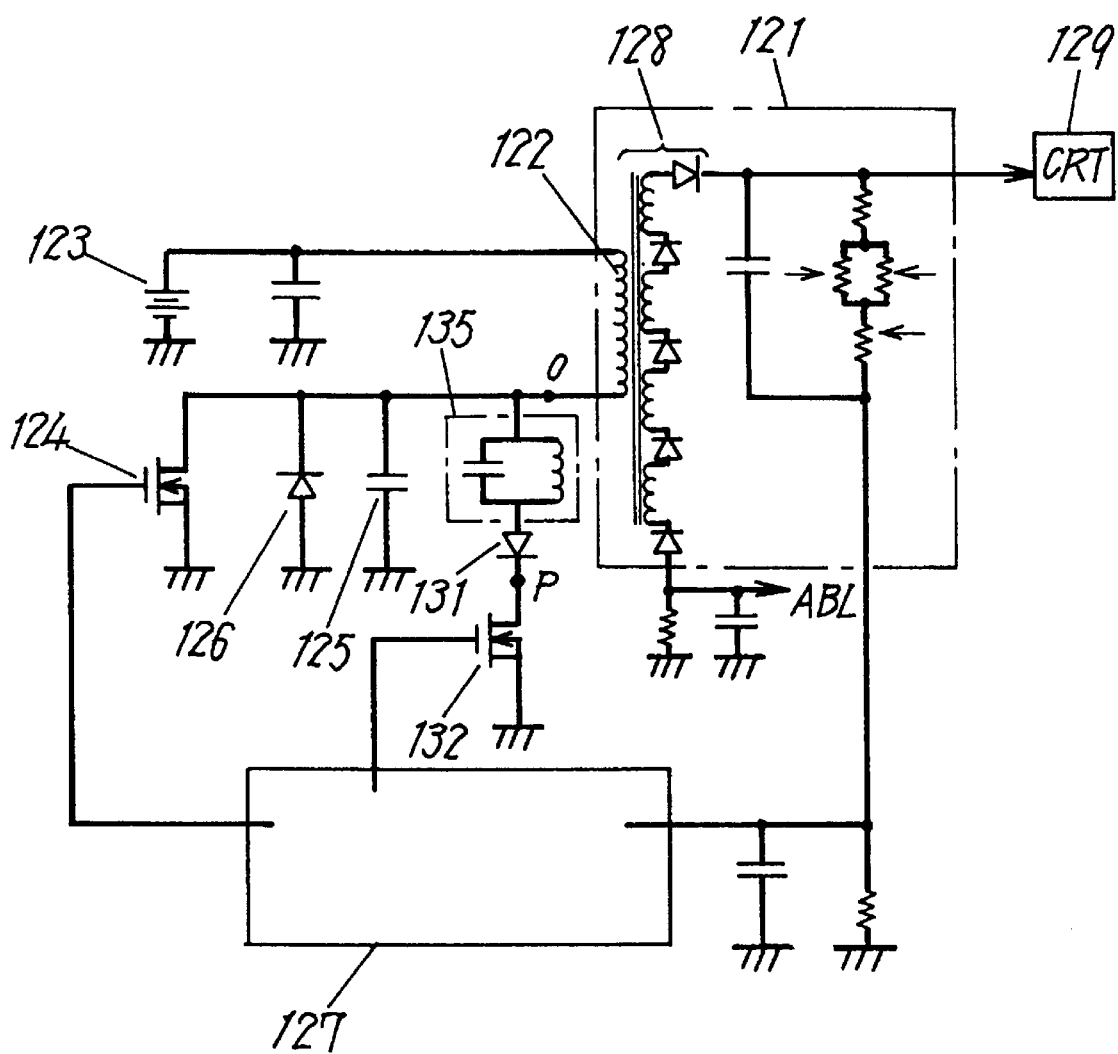
FIG. 6 is a circuit diagram illustrating a power supply circuit of a fourth exemplary embodiment of this invention.

In FIG. 6, a power supply circuit of the fourth exemplary embodiment of the present invention is an improved version of the transformer power supply circuit of the first exemplary embodiment of this invention.

The power supply circuit for transformer in this fourth exemplary embodiment of the invention is provided with a driving power supply 123 connected to one side of terminals of a primary coil 122 of a transformer 121, a first switching element 124, a capacitor 125, and a first diode 126, all connected to the other side of the terminals of the primary coil 122.

Furthermore, the first switching element 124 is comprised of a first MOS type field-effect transistor (MOS FET) that has an internal diode. This first MOS type field-effect transistor is disposed in a manner that a drain is connected to the other side terminal of the primary coil 122, a source is connected to a ground side, and a gate is connected to a PWM type control circuit 127, which generates a pulse wave to control the first switching element 124. It contains the internal diode with an anode connected to the ground side, and a cathode to the other side terminal of the primary coil 122. The capacitor 125 has its one end connected to the other side terminal of the primary coil 122, and the other end connected to the ground side. The first diode 126 has its cathode connected to the other side terminal of the primary coil 122, and an anode connected to the ground side. The cathode of the first diode 126 and the one end of the capacitor 125 are connected to a point between the drain of the first MOS type field-effect transistor and the primary coil 122.

In addition, there are provided an L-C resonance circuit 135 connected to the primary coil 122, a second diode 131 connected to the L-C resonance circuit 135, and a second switching element 132 connected to the second diode 131.

Moreover, the second switching element 132 is comprised of a second MOS type field-effect transistor, and this first MOS type field-effect transistor has a drain connected to a cathode side of the second diode 131, a source connected to the ground side, and a gate connected to the control circuit 127. The second diode 131 has its anode connected to one side of the L-C resonance circuit 135. The L-C resonance circuit 135 has one end connected to the other side terminal of the primary coil 122, and the other end connected to the anode side of the second diode 131.

Figure 7:
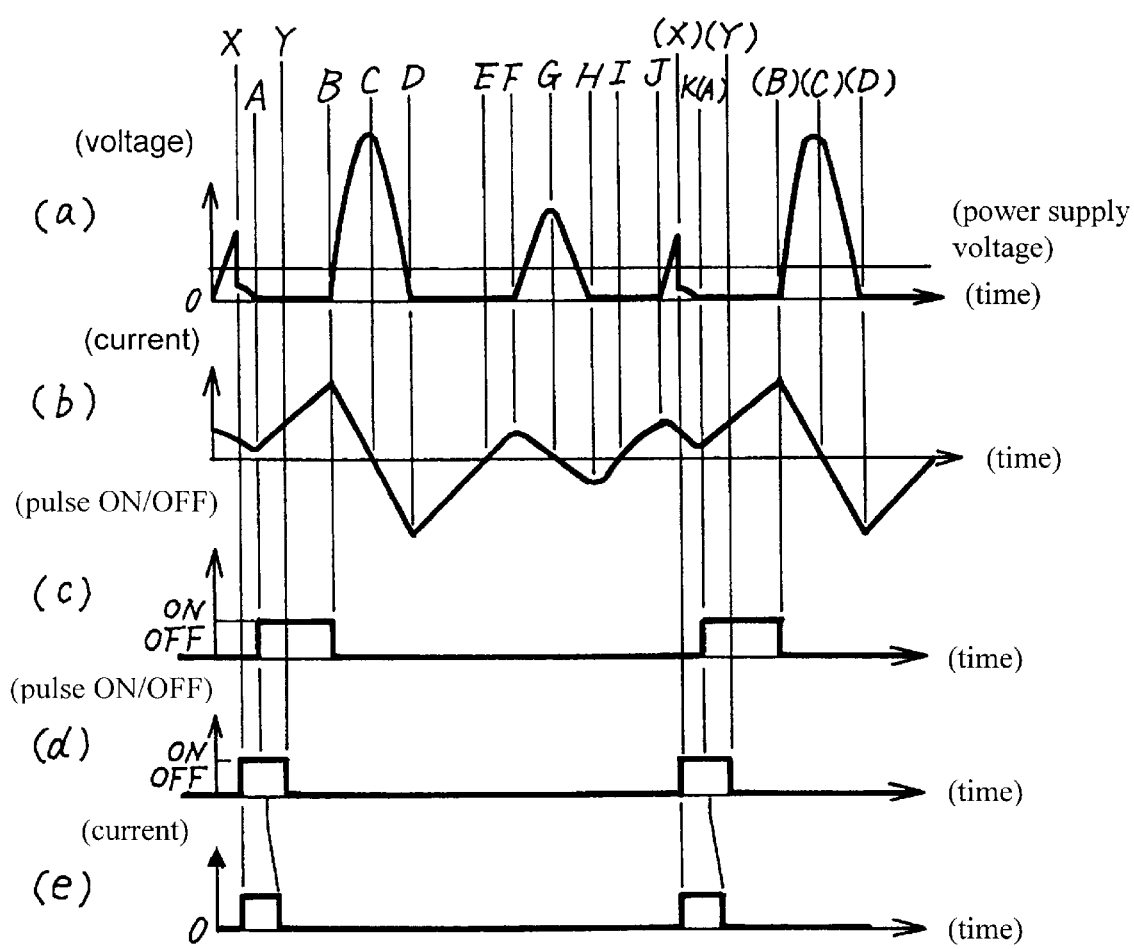
FIG. 7 is a drawing of waveforms showing time series of changes in voltage, current, and switch pulse in the same power supply circuit.

The control circuit 127 generates a pulse wave to control the first switching element 124 and the second switching element 132, thereby the second switching element 132 is switched into an ON state when voltage of the primary coil 122 is greater than the voltage level of the driving power supply after an electric current flows in the first diode 126 while the first switching element 124 is in its OFF state (at points X and (X) in FIG. 7), and into an OFF state while the first switching element 124 is in its ON state (at points Y and (Y) in FIG. 7).

In addition, the secondary coil 128 is connected with a display 129 (CRT) having high horizontal and vertical scanning frequency, or the like.

In this power supply circuit, waveforms representing voltage, current and switch pulses, as they change with a lapse of time, are shown in FIG. 7.

In FIG. 7, a reference letter (a) represents a waveform illustrating a time series of change in value of voltage induced in the primary coil 122 of the transformer 121 taken at a point "O" in the power supply circuit of FIG. 6; a letter (b) a waveform illustrating a time series of change in amount of current flowing in the point "O" in the power supply circuit; a letter (c) a waveform illustrating a time series of change in shape of an output wave of a control circuit fed to the first switching element 124; a letter (d) a waveform illustrating a time series of change in shape of another output wave of the control circuit fed to the second switching element 132; and a letter (e) a waveform illustrating a time series of change in amount of current flowing in a point "P" in the power supply circuit of FIG. 6.

During a period of A to B, when a pulse wave (the output wave) of a predetermined duration shown by the waveform (c) is input from the control circuit 127 to the first switching element 124, turning the first switching element 124 into its ON state, amount of electric current in the point "O" increases with time in proportion to a duration of the ON state of the first switching element 124, as shown by the waveform (b), and thereby energy is charged into the primary coil 122.

During a period of B to C, when an input of the pulse wave from the control circuit 127 to the first switching element 124 is ceased as shown by the waveform (c), causing the first switching element 124 to turn into an OFF state, the energy charged in the primary coil 122 begins to be charged into the capacitor 125, and amount of the current in the point "O" decreases with time, as shown by the waveform (b). The voltage of the primary coil 122 reaches its peak value as shown by the waveform (a), when the charge is completed.

During a period of C to D, after completion of the charge into the capacitor 125, the energy charged in the capacitor 125 begins to be recharged into the primary coil 122 again, and amount of the current in the point "O" decreases with time, as shown by the waveform (b). The voltage of the primary coil 122 becomes zero as shown by the waveform (a), when the charge is completed.

During a period of D to E, when the charge to the primary coil 122 is completed, the energy charged in the primary coil 122 is about to start being recharged into the capacitor 125 again, and this recharge of the capacitor 125 begins through the ground side due to an effect of a positive-negative relation in polarity of the voltage across the primary coil 122. However, a current flows through the first diode 126 having a low impedance, instead of charging the capacitor 125, since the first diode 126 is disposed between the other side terminal of the primary coil 122 and the ground, with the anode connected to the ground side. Therefore, although amount of the current in the point "O" increases with time as shown by the waveform (b), the voltage of the primary coil 122 remains zero as shown by the waveform (a), since no energy is charged in the capacitor 125.

During a period of E to F, since the energy charged in the primary coil 122 has been discharged due to a flow of the current through the first diode 126, amount of the current shown by the waveform (b) in the point "O" shall theoretically remain zero, unless the switching element 124 is turned into an ON state with the waveform (c). In reality, however, amount of the current in the point "O" increases for a certain period of time as shown by the waveform (b).

A certain amount of energy is therefore charged in the primary coil 122 due to the increase in amount of the current through the point "O".

Subsequently, during a period of F to G, the energy charged in the primary coil 122 begins to be charged into the capacitor 125 in the same manner as above, after the charge to the primary coil 122 is completed. Thus, amount of the current in the point "O" decreases with time, as shown by the waveform (b), and the voltage of the primary coil 122 reaches its peak value as shown by the waveform (a), when the charge is completed.

During a period of G to H, after completion of the charge into the capacitor 125, the energy charged in the capacitor 125 begins to be recharged into the primary coil 122 again, and amount of the current in the point "O" decreases with time, as shown by the waveform (b). The voltage of the primary coil 122 becomes zero as shown by the waveform (a), when the charge is completed.

During a period of H to I, when the charge to the primary coil 122 is completed, the energy charged in the primary coil 122 is about to start being recharged into the capacitor 125 again. While amount of the current in the point "O" increases with time as shown by the waveform (b), the voltage of the primary coil 122 remains zero as shown by the waveform (a), since no energy is charged into the capacitor 125.

During a period of I to J, amount of the current in the point "O" again increases for a certain period of time in the same manner as described above, as shown by the waveform (b), and energy is hence charged in the primary coil 122.

During a period of J to K (A), after the charge to the primary coil 122 is completed, the energy charged in the primary coil 122 begins to be charged into the capacitor 125. Amount of the current in the point "O" decreases with time, as shown by the waveform (b), and the voltage of the primary coil 122 reaches its peak value as shown by the waveform (a), when the charge is completed. Since the first switching element 124 is turned into an ON state during this period, as shown by the waveform (c), this becomes a new starting point again.

In addition, the second switching element 132 is so operated that it turns into an ON state when voltage of the primary coil 122 is greater than the voltage level of the driving power supply 123 after an electric current flows in the first diode 126 while the first switching element 124 is in its OFF state (at points X and (X)), and it turns into an OFF state while the first switching element 124 is in its ON state (at points Y and (Y)).

At a time when the second switching element 132 goes into an ON state as shown by the waveform (d), an electric current flows through the point "P" simultaneously, as shown by the waveform (e), and thereby the voltage output to the primary coil 122 becomes equal to or smaller than the voltage level of the driving power supply 123, as shown by the waveform (a), due to an effect of the L-C resonance circuit 135.

In this embodiment, the L-C resonance circuit 135 is used as a waveform shaping circuit for reducing the-output voltage to the primary coil 122 to a value equal to or smaller than the voltage level of the driving power supply 123, and it has a resonance time constant in synchronization with undulation of the current waveform generated in the primary coil 122, as it outputs a shaping wave that cancels the undulation of the current generated in the primary coil 122.

In respect of the resonance time constant, values of an inductance (L) and a capacitance (C) employed in the L-C resonance circuit 135 are determined to satisfy a condition of (a period of fundamental frequency of the undulation)= 1/(resonance frequency of the L-C resonance circuit 135).

Subsequently, in a period of (A) to (D), same operations as described above are repeated.

With the above-described composition, voltage of the primary coil 122 decreases to nearly zero at the moment the second switching element 132 is turned on, when the voltage of the primary coil 122 is greater than the voltage of the driving power supply, and the voltage of the primary coil 122 then becomes zero at the moment the first switching element 124 is turned on, since the second switching element 132 is switched into its ON state when voltage of the primary coil 122 is greater than the voltage level of the driving power supply after an electric current flows in the first diode 126 while the first switching element 124 is in its OFF state (at the points X and (X)).

In other words, there is no sudden change in voltage, and undulation liable to occur in the current wave can be restricted, since the voltage always changes from a value equal to or below the voltage of the driving power supply to zero at the moment the first switching element 124 is turned on.

However, since the first switching element 124 is not turned into its ON state during a state wherein voltage of the primary coil 122 has already been zero, there occurs undulation to a certain extent due to this difference in voltage.

This undulation can be suppressed, however, since the L-C resonance circuit 135 has the resonant time constant in synchronization with the undulation of the current wave generated in the primary coil 122, and outputs the shaping wave in a manner to cancel the undulation.

According to the fourth exemplary embodiment as described, there occurs no sudden change in voltage, and undulation liable to occur in the current wave can be suppressed, since the voltage always changes from a value equal to or below the voltage of the driving power supply 123 to zero at the moment the first switching element 124 is turned on.

Even if undulation occurs to a certain extent because the voltage of the primary coil 122 is not zero, although it is equal to or less than the voltage of the driving power supply 123, at the moment the first switching element 124 is turned on, the undulation can be suppressed to a great extent, since the L-C resonance circuit 135 has the resonance time constant synchronized with the undulation in the current waveform generated in the primary coil 122, and it outputs the shaping wave that cancel the undulation.

Fifth Exemplary Embodiment

Referring now to the accompanying figures, a power supply circuit of a fifth exemplary embodiment of this invention will be described hereinafter.

Figure 8:
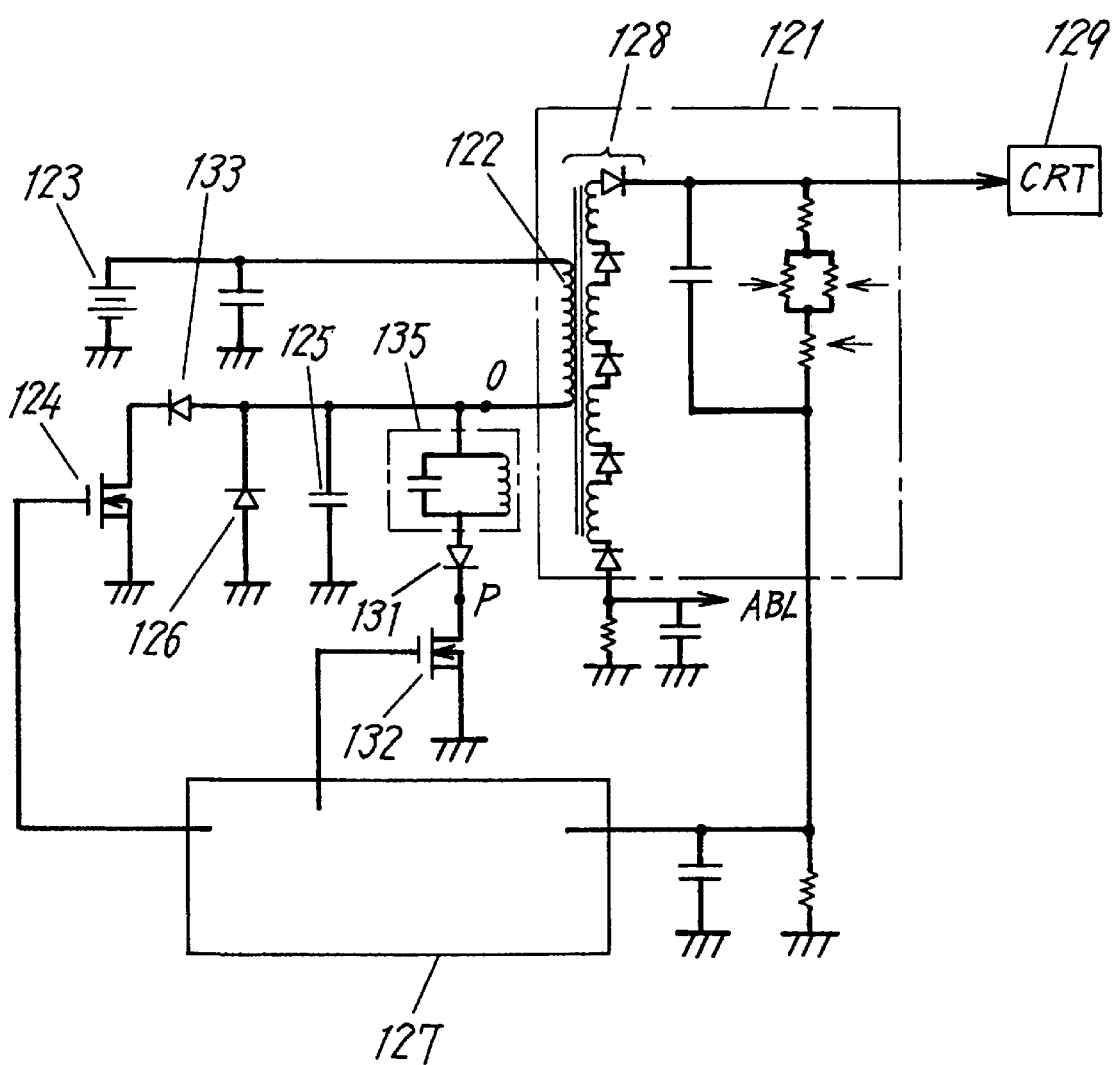
FIG. 8 is a circuit diagram illustrating a power supply circuit of a fifth exemplary embodiment of this invention.
Figure 9:
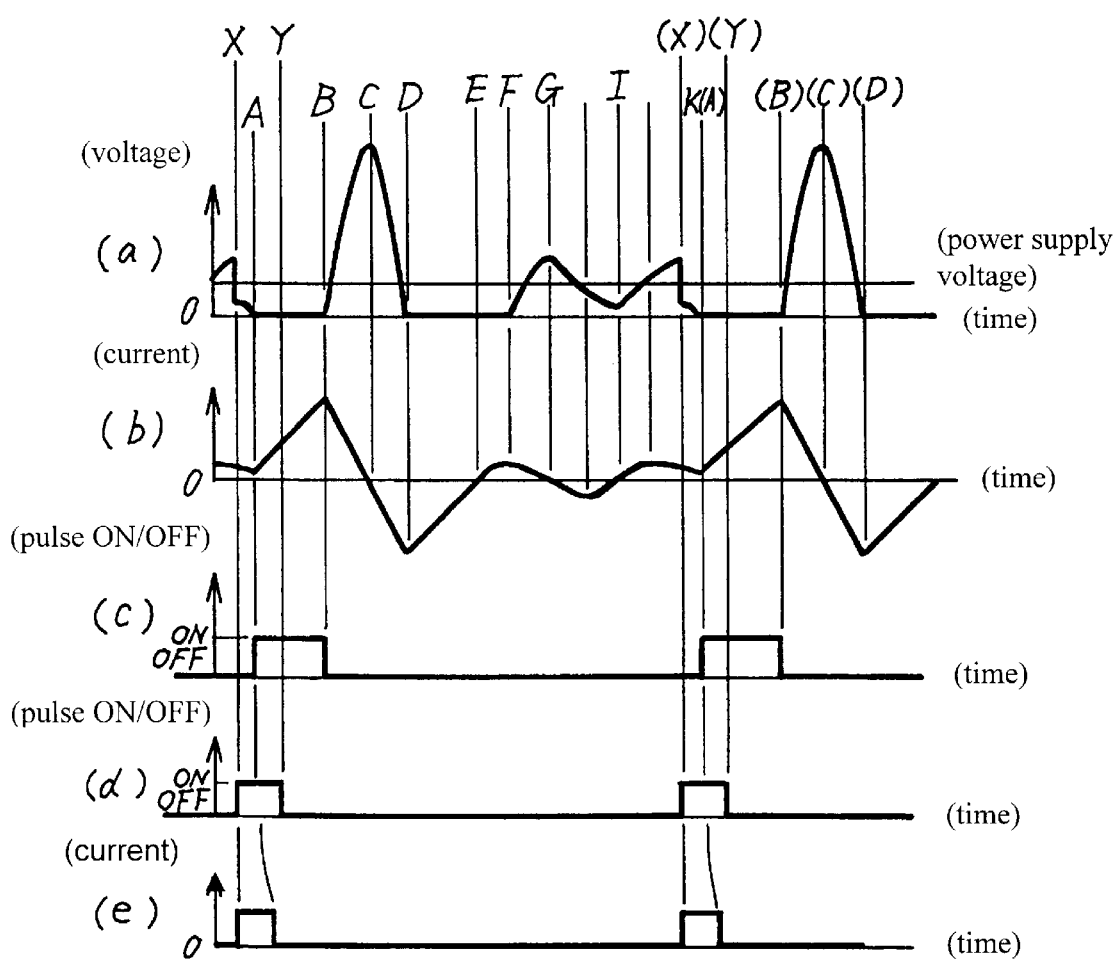
FIG. 9 is a drawing of waveforms showing time series of changes in voltage, current, and switch pulse in the same power supply circuit.

In FIG. 8 and FIG. 9, the power supply circuit for a transformer in the fifth exemplary embodiment of the present invention is a modified version of the transformer power supply circuit of the fourth exemplary embodiment of this invention. Therefore, the same structural components are assigned with the same reference numerals.

The power supply circuit of the fifth exemplary embodiment of this invention has a composition comprising a third diode 133 disposed between a drain of a MOS type field-effect transistor constituting a first switching element 124 and a cathode of a first diode 126 in the transformer power supply circuit of the fourth exemplary embodiment of this invention, wherein a cathode of the third diode 133 is connected to a drain of the MOS type field-effect transistor serving as the first switching element 124, and an anode of the third diode 133 is connected to the cathode of the first diode 126.

In this power supply circuit, waveforms of voltage, current and switch pulses, as they change with a lapse of time, are shown in FIG. 9.

In FIG. 9, a reference letter (a) represents a waveform illustrating a time series of change in value of voltage induced in a primary coil 122 of a transformer 121 taken at a point "O" in the power supply circuit of FIG. 8; a letter (b) a waveform illustrating a time series of change in amount of current flowing in the point "O" in the power supply circuit; a letter (c) a waveform illustrating a time series of change in shape of an output wave of a control circuit 127 fed to the first switching element 124; a letter (d) a waveform illustrating a time series of change in shape of an output wave of the control circuit 127 fed to a second switching element 132; and a letter (e) a waveform illustrating a time series of change in amount of current flowing in a point "P" in the power supply circuit of FIG. 8. Illustration of the waveforms in the fifth exemplary embodiment is identical to the corresponding illustration in the third exemplary embodiment, except for the waveforms (a) and (b) in a period between E and K(A).

During the period of E through K(A), a voltage shown by the waveform (a) does not become smaller than zero, even though the generated voltage indicates an L-C resonance around a driving power supply voltage, since an addition of the third diode 133 reduces an amount of current produced, as shown by the waveform (b).

Therefore, once an electric current flows through the first diode 126 for the first time, this composition does not allow subsequent current to flow through it at the second time and thereafter, thereby preventing the phenomenon that no current flows in the first switching element 124 when the first switching element 124 is turned into an ON state, as shown by the waveform (c). Hence, it can produce a voltage reliably across the primary coil 122 of the transformer 121, even for a display 129 having high resolution with high horizontal and vertical scanning frequency, or the like.

Additionally, in the same manner as the power supply circuit of the third exemplary embodiment, the second switching element 132 is so operated that it turns into an ON state when voltage of the primary coil 122 is greater than a voltage level of the driving power supply after an electric current flows in the first diode 126 while the first switching element 124 is in its OFF state (at points X and (X) in FIG. 9), and it turns into an OFF state while the first switching element 124 is in its ON state (at points Y and (Y) in FIG. 9). Therefore, voltage of the primary coil 122 decreases to the voltage level of the driving power supply 123 at the moment the second switching element 132 is turned on, when the voltage of the primary coil 122 is greater than the voltage of the driving power supply 123, and that the voltage of the primary coil 122 becomes zero at the moment the first switching element 124 is turned on.

In other words, there occurs no sudden change in voltage, and undulation liable to occur in the current wave can be restricted, since the voltage always changes from a level below the voltage of the driving power supply 123 to zero at the moment the first switching element 124 is turned on.

According to the fifth exemplary embodiment as described, it can prevent the phenomenon that no current flows in the first switching element 124, and thereby producing a voltage reliably across the primary coil 122 of the transformer 121 even for the display 129 having high resolution with high horizontal and vertical scanning frequency, or the like, in addition to the advantages attained in the fourth exemplary embodiment. Moreover, since the voltage always changes from a level equal to or below the voltage of the driving power supply 123 to zero at the moment the first switching element 124 is turned on, no sudden change occurs in the voltage, and thereby restricting undulation that is liable to occur in the current wave.

In the above exemplary embodiment of this invention, although the L-C resonance circuit 135 has been employed as a waveform shaping circuit, it may be replaced by a resistance circuit, which outputs such a shaping wave that absorbs undulation of the current wave generated by the primary coil 122, to yield a similar effect.

Sixth Exemplary Embodiment

Referring now to the accompanying figures, a power supply circuit of a sixth exemplary embodiment of the present invention will be described hereinafter.

Figure 10:
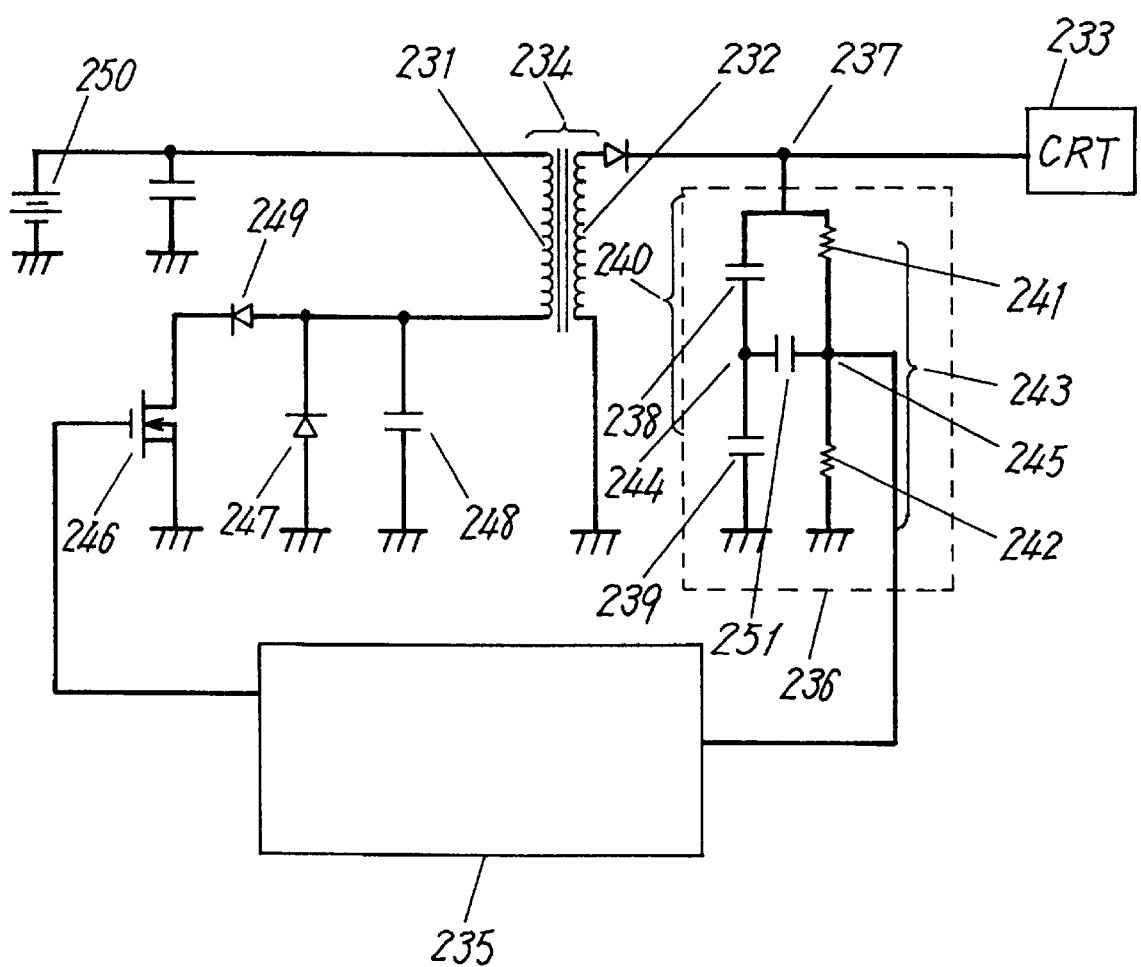
FIG. 10 is a circuit diagram illustrating a power supply circuit of a sixth exemplary embodiment of this invention.

In FIG. 10, the power supply circuit of the sixth exemplary embodiment of this invention is a modified version of the transformer power supply circuit of the first exemplary embodiment of this invention shown in FIG. 1.

The power supply circuit of the sixth exemplary embodiment of this invention comprises a flyback transformer represented by a transformer 234 having a primary coil 231 and a secondary coil 232 for supplying anode voltage to a display 233 such as a display device, a PWM type control circuit 235 for controlling low output voltage input to the primary coil 231, and a high-voltage detection circuit 236 for detecting high output voltage output from the secondary coil 232 as a detected voltage.

The control circuit 235 controls the low output voltage based on the detected voltage. The high-voltage detection circuit 236 is disposed between an intermediate point 237 connecting the secondary coil 232 and the display 233 and the control circuit 235. The high-voltage detection circuit 236 is so composed that a group of serially connected capacitors 240 comprising a first detection capacitor 238 and a second detection capacitor 239 and a group of serially connected resistors 243 comprising a first resistor 241 and a second resistor 242 are connected in parallel between the intermediate point 237 and a ground, a first midpoint 244 between the first detection capacitor 238 and the second detection capacitor 239 and a second midpoint 245 between the first resistor 241 and the second resistor 242 are connected with a third detection capacitor 251, and the second midpoint 245 is connected to the control circuit 235.

Furthermore, the primary coil 231 of the transformer 234 is connected with a first switching element 246, a damper diode 247, a resonance capacitor 248, a diode 249 for canceling a reverse recovery time of the first switching element 246, and a driving power supply 250.

A capacitance (C1) of the first detection capacitor 238, a capacitance (C2) of the second detection capacitor 239, a resistance (R1) of the first resistor 241, and a resistance (R2) of the second resistor 242 are arranged in such values that there is a relation of (C1)×(R1)=(C2)×(R2). With a contribution of a capacitance (C3) of the third detection capacitor 251, the capacitance (C2) of the second detection capacitor 239 may increase or decrease ,so as to change the relation of (C1)×(R1)=(C2)×(R2) to either of (C1)×(R1)>(C2)×(R2) and (C1)×(R1)<(C2)×(R2).

Figure 11:
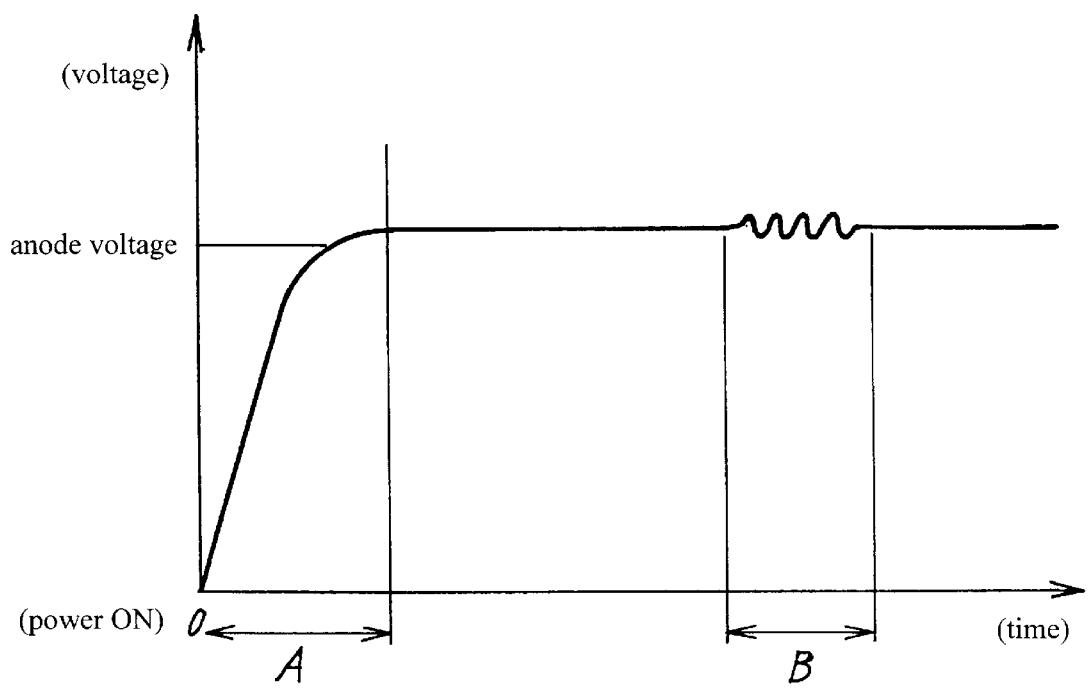
FIG. 11 is a drawing of a waveform showing a high voltage wave output by a transformer in the same power supply circuit.

A schematic illustration representing a waveform of the high output voltage of the transformer 234 is shown in FIG. 11. In this waveform illustration, a range "A" represents a start-up characteristic of the power supply circuit at power-on, and a range "B" represents a dynamic characteristic of the same.

Because of the above-described composition, in which the first midpoint 244 between the first detection capacitor 238 and the second detection capacitor 239 and the second midpoint 245 between the first resistor 241 and the second resistor 242 are connected by the third detection capacitor 251, the capacitance (C2) of the second detection capacitor 239 comes to be a value derived by adding the capacitance (C3) of the third detection capacitor 251 to it, at the moment the power supply circuit is turned on, since all of the first detection capacitor 238, the second detection capacitor 239, and the third detection capacitor 251 do not carry electric charge, and therefore values of the respective capacitances (C1), (C2), and (C3) are zero at the moment of power-on. Hence, their relation with the resistance (R1) of the first resistor 241 and the resistance (R2) of the second resistor 242 becomes (C1)×(R1)<(C2)×(R2).

Furthermore, since the capacitance (C1) of the first detection capacitor 238, the capacitance (C2) of the second detection capacitor 239, and the capacitance (C3) of the third detection capacitor 251 carry electric charge in a steady state after the power is turned on, a value of the capacitance (C2) of the second detection capacitor 239 decreases as a composite capacity, and they become (C1)×(RI)>(C2)×(R2).

Figure 12:
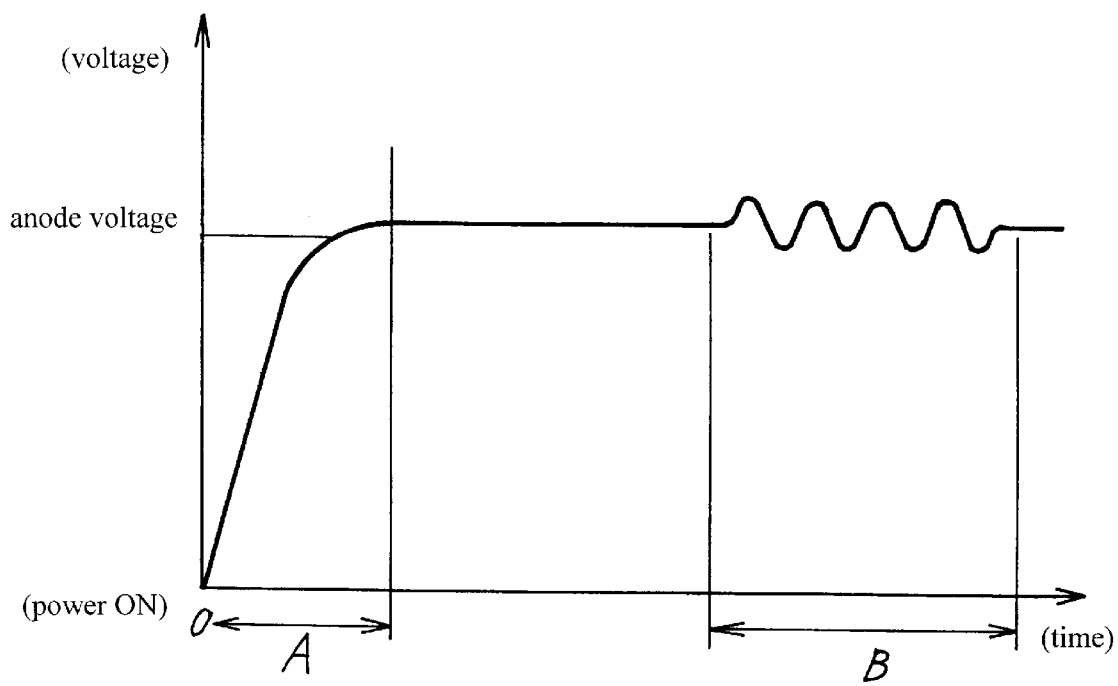
FIG. 12 is another drawing of a waveform showing a high voltage wave output by a transformer of poor dynamic characteristic.
Figure 13:
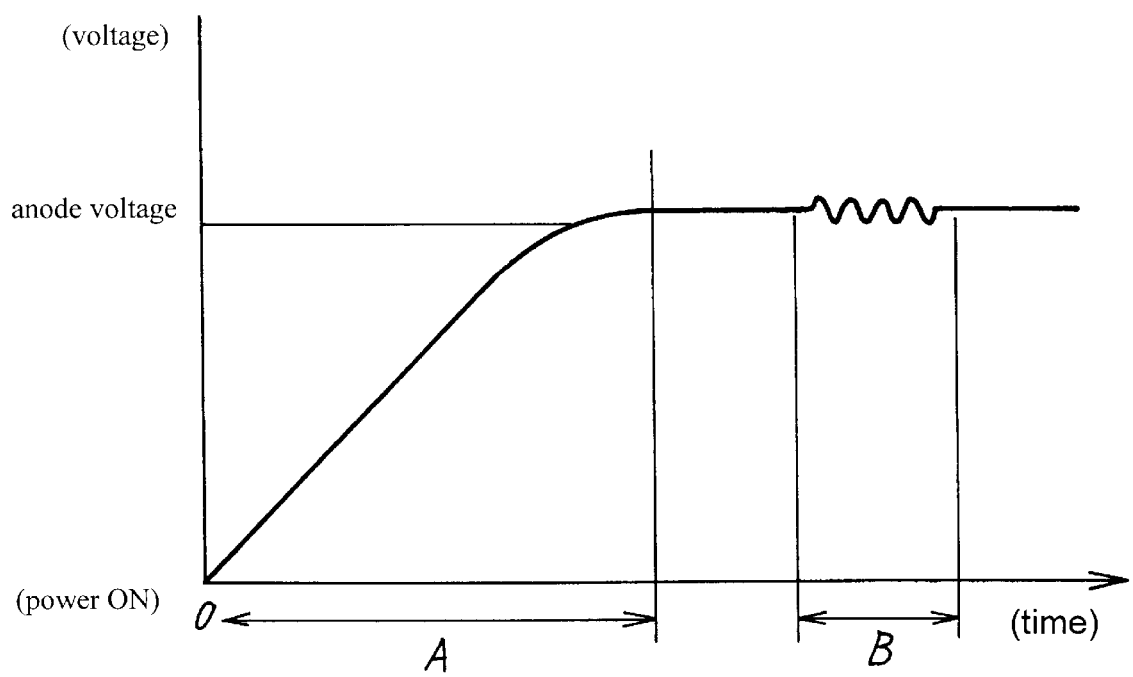
FIG. 13 is still another drawing of a waveform showing a high voltage wave output by a transformer of poor rising characteristic.

It can therefore improve both of the start-up characteristic and the dynamic characteristic simultaneously, as shown in FIG. 11, without holding on to a poor dynamic characteristic as shown in FIG. 12, and a poor start-up characteristic as shown in FIG. 13.

As has been described, since the first midpoint 244 between the first detection capacitor 238 and the second detection capacitor 239 and the second midpoint 245 between the first resistor 241 and the second resistor 242 are connected by the third detection capacitor 251, the sixth exemplary embodiment can improve the start-up characteristic as well as the dynamic characteristic at the same time.

Seventh Exemplary Embodiment

A power supply circuit of a seventh exemplary embodiment of this invention will be described hereinafter with reference to the accompanying figures.

Figure 14:
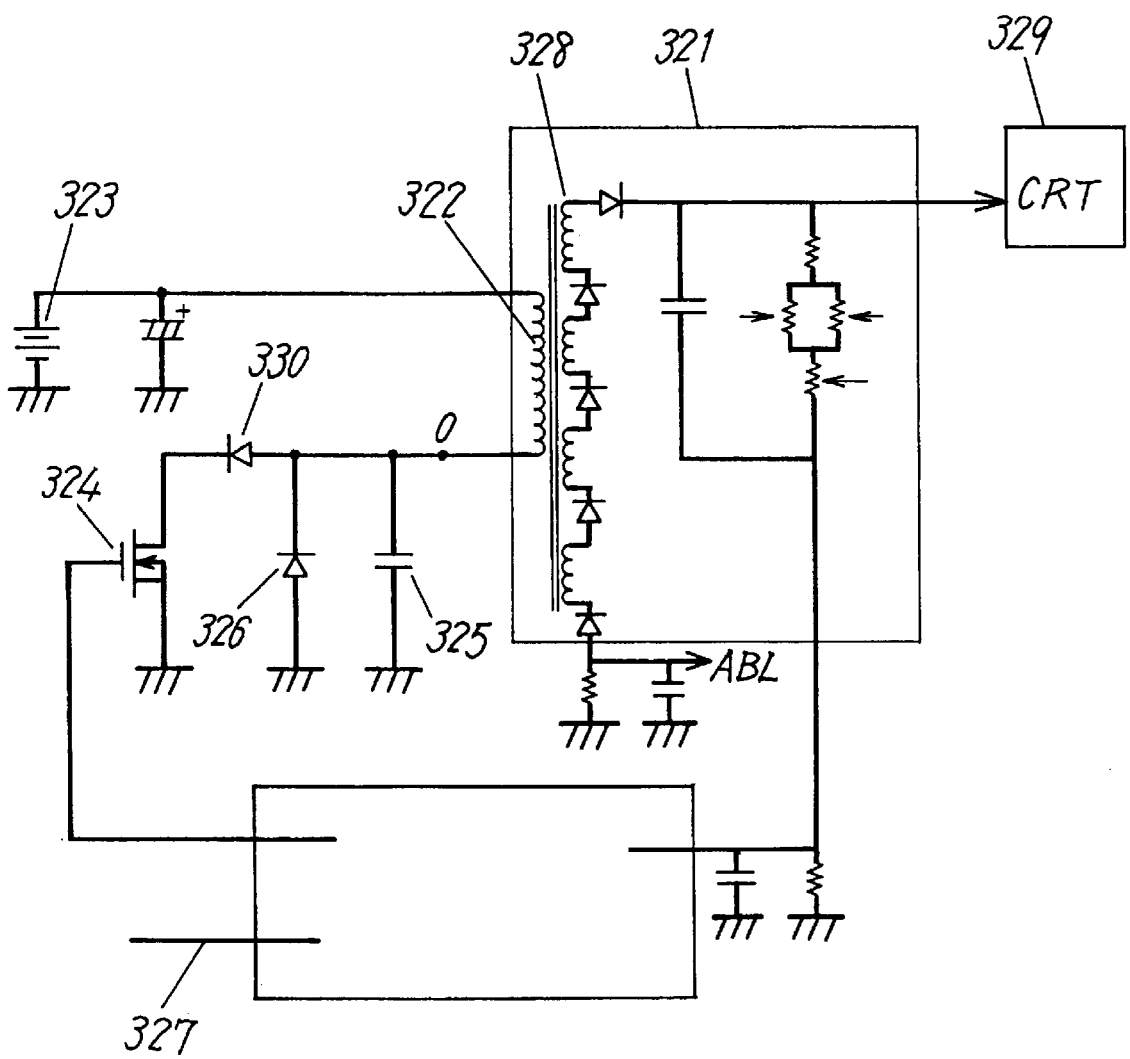
FIG. 14 is a circuit diagram of a power supply circuit of a seventh exemplary embodiment of this invention.

In FIG. 14, a power supply circuit of the seventh exemplary embodiment of the present invention is an improved version of the transformer power supply circuit shown in FIG. 1 of the first exemplary embodiment.

The power supply circuit in the seventh exemplary embodiment of this invention is provided with a driving power supply 323 connected to one side of terminals of a primary coil 322 of a transformer 321, a first switching element 324, a capacitor 325, and a first diode 326, all connected to the other side of the terminals of the primary coil 322.

Furthermore, the first switching element 324 is comprised of a first MOS type field-effect transistor (MOS FET) that has an internal diode. This first MOS type field-effect transistor is disposed in a manner that a drain is connected to the other side terminal of the primary coil 322, a source is connected to a ground side, and a gate is connected to a control circuit 327, which generates a pulse wave to control the first switching element 324. It contains the internal diode with its anode connected to the ground side, and a cathode to the other side terminal of the primary coil 322. The capacitor 325 has its one end connected to the other side terminal of the primary coil 322, and the other end connected to the ground side. The first diode 326 has its cathode connected to the other side terminal of the primary coil 322, and an anode connected to the ground side. The cathode of the first diode 326 and one end of the capacitor 325 are connected to a point between the drain of the transistor and the primary coil.

In addition, a third diode 330 is provided between the cathode of the first diode 326 and the drain of the transistor. The third diode 330 is disposed with its cathode connected to the drain side of the transistor, and its anode connected to the cathode side of the first diode 326.

Furthermore, one end of the capacitor 325 is connected to a point between the cathode of the first diode 326 and the primary coil 322.

The first diode 326 and the third diode 330 have their current reverse-recovery time shorter than that of the internal diode of the transistor. The secondary coil 328 is connected with a display 329 (CRT) having high horizontal and vertical scanning frequency, or the like.

Figure 15:
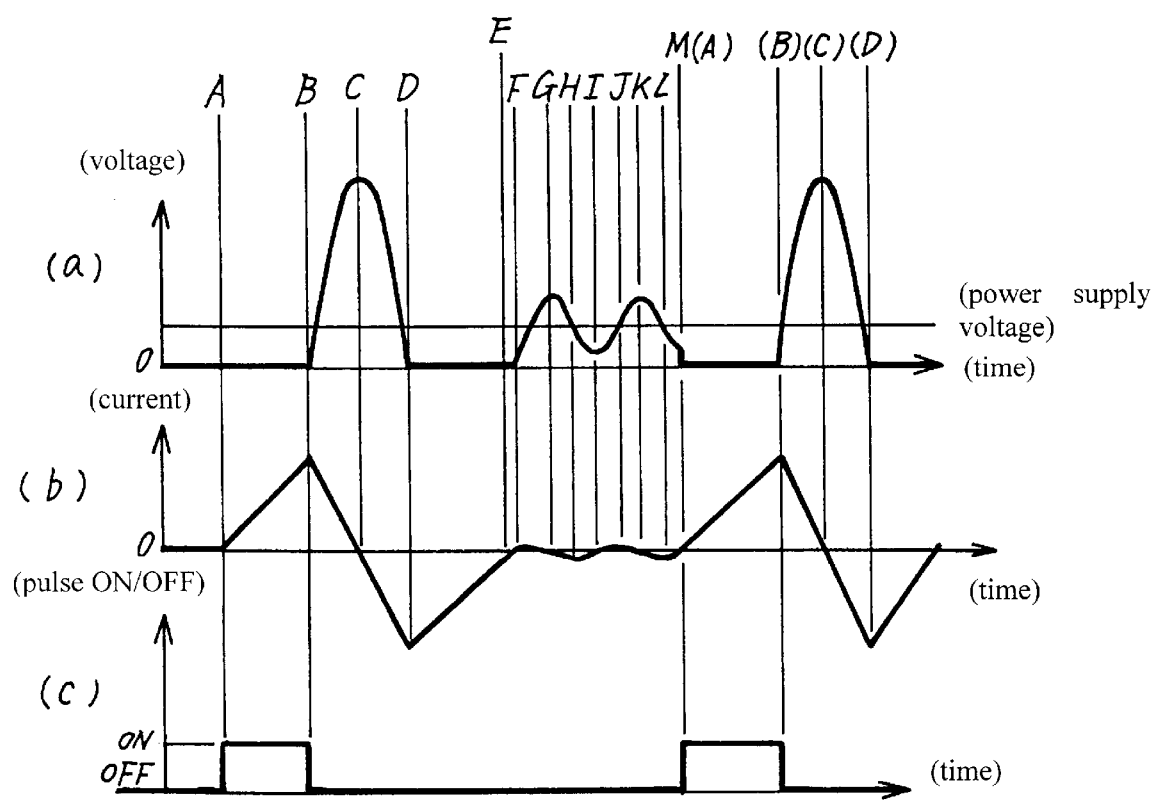
FIG. 15 is a drawing of waveforms showing time series of changes in voltage, current, and switch pulse in the same power supply circuit.
Figure 16:
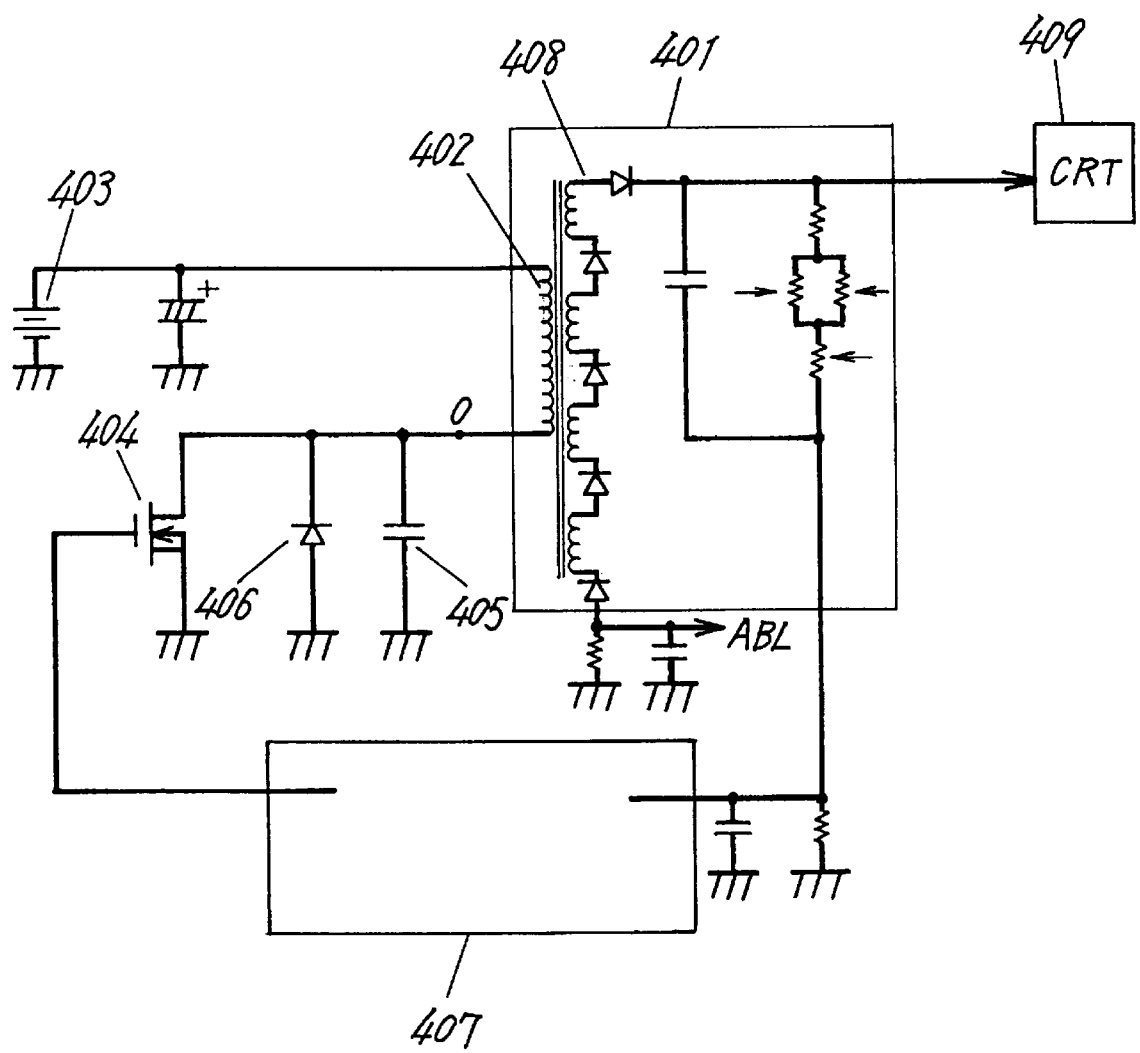
FIG. 16 is a circuit diagram of a power supply circuit of the prior art.
Figure 17:
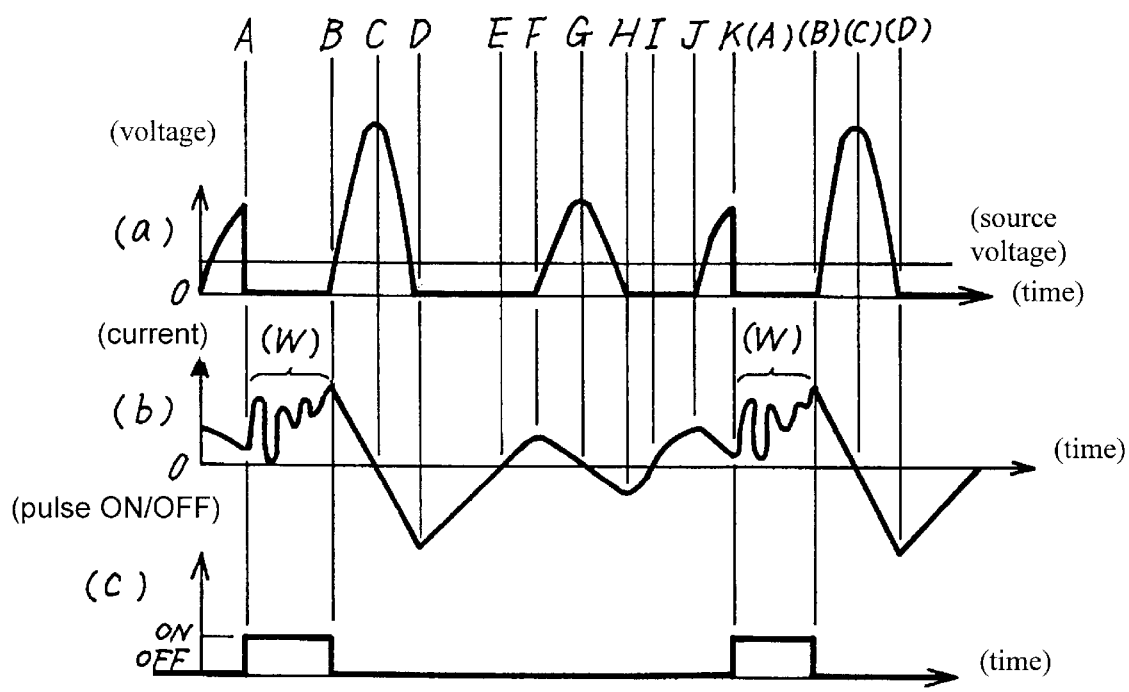
FIG. 17 is a drawing of waveforms showing time series of changes in voltage, current, and switch pulse in the same power supply circuit.

In this power supply circuit, waveforms of voltage, current and switch pulses, as they change with a lapse of time, are shown in FIG. 15.

In FIG. 15, a reference letter (a) represents a waveform illustrating a time series of change in value of voltage induced in the primary coil 322 of the transformer 321 taken at a point "O" in the power supply circuit of FIG. 14; a letter (b) a waveform illustrating a time series of change in amount of current in the point "O" of the power supply circuit; and a letter (c) a waveform illustrating a time series of change in shape of an output wave of the control circuit 327 fed to the first switching element 324.

During a period of A to B, when a pulse wave (the output wave) of a predetermined duration shown by the waveform (c) is input from the control circuit 327 to the first switching element 324, making the first switching element 324 into an ON state, amount of electric current in the point "O" increases with time in proportion to a duration of the ON state of the first switching element 324 as shown by the waveform (b), and thereby energy is charged into the primary coil 322.

During a period of B to C, when an input of the pulse wave from the control circuit 327 to the first switching element 324 ceases as shown by the waveform (c), causing the first switching element 324 into an OFF state, the energy charged in the primary coil 322 begins to be charged into the capacitor 325, and amount of the current in the point "O" decreases with time, as shown by the waveform (b). The voltage of the primary coil 322 reaches its peak value as shown by the waveform (a), when the charge is completed.

During a period of C to D, after a completion of the charge into the capacitor 325, the energy charged in the capacitor 325 begins to be recharged into the primary coil 322 again, and amount of the current in the point "O" decreases with time, as shown by the waveform (b). The voltage of the primary coil 322 becomes zero as shown by the waveform (a), when the charge is completed.

During a period of D to E, when the charge to the primary coil 322 is completed, the energy charged in the primary coil 322 is about to start being recharged into the capacitor 325 again, and this recharge of the capacitor 325 begins through the ground side due to an effect of a positive-negative relation in polarity of the voltage across the primary coil 322. However, a current flows through the first diode 326 having a low impedance, instead of charging the capacitor 325, since the first diode 326 is disposed between the other side terminal of the primary coil 322 and the ground, with the anode connected to the ground side. Therefore, although amount of the current in the point "O" increases with time as shown by the waveform (b), the voltage of the primary coil 322 remains zero as shown by the waveform (a), since no energy is charged in the capacitor 325.

During a period of E to F since the energy charged in the primary coil 322 has been discharged due to the current flowed through the first diode 326, amount of the current shown by the waveform (b) in the point "O" shall theoretically remain zero, unless the switching element 324 is switched into an ON state with the waveform (c). In reality, however, amount of the current in the point "O" increases for a certain period of time as shown by the waveform (b).

A certain amount of energy is therefore charged in the primary coil 322 due to the increase in amount of current in the point "O".

During a period of F to G, the energy charged into the primary coil 322 begins to be charged into the capacitor 325 in the same manner as above, after the charge to the primary coil 322 is completed. Thus, amount of the current in the point "O" decreases with time, as shown by the waveform (b), and the voltage of the primary coil 322 reaches its peak value as shown by the waveform (a), when the charge is completed.

During a period of G to H, after completion of the charge into the capacitor 325, the energy charged in the capacitor 325 begins to be recharged into the primary coil 322 again, and amount of the current in the point "O" decreases with time, as shown by the waveform (b). The voltage of the primary coil 322 becomes equal to the voltage of the driving power supply 323 as shown by the waveform (a), when the charge is completed.

During a period of H to I, when the charge to the primary coil 322 is completed, the energy charged in the primary coil 322 begins to be recharged into the capacitor 325 again, and amount of the current in the point "O" increases with time, as shown by the waveform (b). The voltage of the primary coil 322 becomes smaller than the voltage of the driving power supply 323, but greater than zero, as shown by the waveform (a), when the charge is completed.

During a period of I to J, after completion of the charge into the capacitor 325, the primary coil 322 begins to be recharged once again. As amount of the current in the point "O" increases with time, as shown by the waveform (b), and the voltage of the primary coil 322 comes to be equal to the voltage of the driving power supply 323 as shown by the waveform (a), when the charge is completed.

During a period of J to K, after the charge into the primary coil 322 is completed, the energy charged in the primary coil 322 begins to be charged into the capacitor 325. Amount of the current in the point "O" decreases with time, as shown by the waveform (b), and the voltage of the primary coil 322 reaches its peak value as shown by the waveform (a), when the charge is completed.

During a period of K to L, after completion of the charge into the capacitor 325, the energy charged in the capacitor 325 begins to be recharged into the primary coil 322. Amount of the current in the point "O" decreases with time, as shown by the waveform (b), and the voltage of the primary coil 322 becomes equal to the voltage of the driving power supply 323 as shown by the waveform (a), when the charge is completed.

During a period of L to M(A), when the charge to the primary coil 322 is completed, the energy charged in the primary coil 322 begins to be recharged into the capacitor 325 again, and amount of the current in the point "O" increases with time, as shown by the waveform (b). While the voltage of the primary coil 322 becomes smaller than the voltage of the driving power supply 323, but greater than zero, as shown by the waveform (a), upon completion of the charge, the first switching element 324 is turned into its ON state during this period as shown by the waveform (c). Hence, the same steps as described above are repeated again at this time, making it a new starting point.

The composition, as described above, comprises the third diode 330 disposed between the cathode of the first diode 326 and the drain of the transistor, i.e. the first switching element 324, with its cathode connected to the drain side of the transistor and the anode connected to the cathode side of the first diode 326, and the capacitor 325, of which one end is connected to a point between the cathode of the first diode 326 and the primary coil 322. In addition, the first diode 326 and the third diode 330 have their current reverse-recovery time shorter than the internal diode of the transistor. According to the above composition, although an electric current, which is a cause of charging energy into the primary coil 322, flows into the primary coil 322, after the switching element 324 turns into its OFF state from the ON state with the pulse wave generated by the control circuit 327, and the voltage becomes zero as current flows for the first time through the first diode 326, amount of this electric current can be reduced substantially so as to reduce the energy charged in the primary coil 322.

Accordingly, although an L-C resonance occurs in the voltage waveform with reference to the voltage of the driving power supply 323, after the first current flows through the first diode 26, an amplitude of the resonance can be kept small, and the voltage can be maintained greater than zero.

Therefore, this composition can reliably produce a voltage across the primary coil 322 of the transformer 321 even for a display 329 having high resolution with high horizontal and vertical scanning frequency, or the like, since it does not allow electric current to flow through the first diode 326 at the second time and thereafter, and to prevent the phenomenon in that no current flows in the first switching element 324 when the pulse wave is turned into an ON state.

In respect of the internal diode, in particular, which is indispensable for the MOS type field-effect transistor, since the current reverse-recovery time of the first diode 326 and the third diode 330 is shorter than that of the internal diode of the transistor, i.e. the first switching element 324, a dampening time (the time in which a flow of current stops, i.e. the current reverse-recovery time) of the current that flows when the voltage impressed on two ends of the first diode 326 and the third diode 330 is discharged becomes shorter than that of the internal diode of the transistor, or, the first switching element 324.

As a result, a delaying current (the current that flows after measures are taken to dampen the current, until the time the current flow actually stops) due to the first diode 326 and the third diode 330 is suppressed within a shorter time than a delay current that originates in the internal diode of the transistor, and thereby the delay current originating in the internal diode of the transistor is suppressed by the third diode 330 when the electric current flows from the anode to the cathode of the first diode 326. Moreover, since the delay current that originates in the first diode 326 and the third diode 330 can be suppressed in a shorter time than the delay current originating in the internal diode of the transistor, it prevents the transformer and the capacitor from being charged with extra energy.

According to the seventh exemplary embodiment as described, the third diode 330 is connected between the cathode of the first diode 326 and the drain of the transistor, or the first switching element 324, with its cathode connected to the drain side of the transistor and the anode connected to the cathode side of the first diode 326, and one end of the capacitor 325 is connected to the point between the cathode of the first diode 326 and the primary coil 322, and further that the first diode 326 and the third diode 330 have their current reverse-recovery time shorter than the internal diode of the transistor, or the first switching element 324. Therefore, it can positively generate a voltage across the primary coil 322 of the transformer 321, even for the display 329 that has a high resolution with high horizontal and vertical scanning frequency, or the like.

In the seventh exemplary embodiment, although one end of the capacitor 325 is connected to the point between the cathode of the first diode 326 and the primary coil 322, the same effect can also be attained even if it is connected to a point between the cathode of the first diode 326 and the anode of the third diode 330.

Industrial Applicability

As described above, the present invention can provide a power supply circuit that suppresses undulation liable to occur in current wave, and prevents noise from being generated on an display screen, since it employs a noise suppression means between a transformer and a control circuit.

What is claimed is:
1. A power supply circuit comprising:
a transformer having a primary coil and a secondary coil;
a driving power supply connected to a first terminal of said primary coil of said transformer;
a first switching element, a capacitor, and a first diode, all connected to a second terminal of said primary coil; and
a control circuit for generating a pulse wave to control said first switching element, wherein:
said first switching element is comprised of a first MOS type field-effect transistor;
a drain of said first MOS type field-effect transistor is connected to the second terminal of said primary coil, a source is connected to a circuit return path, and a gate is connected to said control circuit;
a first end of said capacitor is connected to the second terminal of said primary coil, and a second end is connected to the circuit return path; and
a cathode of said first diode is connected to the second terminal of said primary coil, and an anode is connected to the circuit return path, and
a noise suppression means connected between said transformer and said control circuit for suppressing generation of noise said noise suppression means having,
an auxiliary coil in mutually inductive relation with said primary coil, a second diode and a second switching element connected to said auxiliary coil;
said second switching element having a second MOS type field-effect transistor;
a drain of said second MOS type field-effect transistor is connected to a cathode side of said second diode, a source is connected to the circuit return path, and a gate is connected to said control circuit;
a first terminal of said auxiliary coil is connected to the circuit return path, and a second terminal is connected to an anode side of said second diode; and
said control circuit generates a pulse signal to control said first switching element and said second switching element in a manner to switch said second switching element into a conducting state while said first switching element is in a non-conducting state and when voltage of said primary coil is greater than voltage of said driving power supply after said first diode conducts, and into a non-conducting state while said first switching element is in a conducting state, to thereby serve as means to suppress noise.
2. A power supply circuit comprising:
a transformer having a primary coil and a secondary coil;
a driving power supply connected to a first terminal of said primary coil of said transformer;
s a first switching element, a capacitor, and a first diode, all connected to a second terminal of said primary coil; and
a control circuit for generating a pulse signal to control said first switching element, wherein:
said first switching element is comprised of a first MOS type field-effect transistor;
a drain of said first MOS type field-effect transistor is connected to the second terminal of said primary coil, a source is connected to a circuit return path, and a gate is connected to said control circuit;
a first end of said capacitor is connected to the second terminal of said primary coil, and a second end is connected to the circuit return path; and
a cathode of said first diode is connected to the second terminal of said primary coil, and an anode is connected to the circuit return path, and a noise suppression means connected between said transformer and said control circuit for suppressing generation of noise, said noise suppression means having,
an auxiliary coil in mutually inductive relation with said primary coil, a second diode and a second switching element connected to said auxiliary coil;
said second switching element having a second MOS type field-effect transistor;
a drain of said second MOS type field-effect transistor is connected to a cathode side of said second diode, a source is connected to the circuit return path, and a gate is connected to said control circuit;
a first terminal of said auxiliary coil is connected to the circuit return path, and a second terminal is connected to an anode side of said second diode; and
said control circuit generates a pulse signal to control said first switching element and said second switching element in a manner to switch said second switching element into an OFF state while said first switching element is in an ON state, and to switch said second switching element into an ON state while said first diode conducts, to thereby serve as means to suppress noise.

3. A power supply circuit comprising:
a transformer having a primary coil and a secondary coil;
a driving power supply connected to a first terminal of said primary coil of said transformer;
a first switching element, a capacitor, and a first diode, all connected to a second terminal of said primary coil; and
a control circuit for generating a pulse wave to control said first switching element, wherein:
said first switching element is comprised of a first MOS type field-effect transistor;
a drain of said first MOS type field-effect transistor is connected to the second terminal of said primary coil, a source is connected to a circuit return path and a gate is connected to said control circuit;
a first end of said capacitor is connected to the second terminal of said primary coil, and the second end is connected to the circuit return path; and
a cathode of said first diode is connected to the second terminal of said primary coil, and an anode is connected to the circuit return path, and
said power supply circuit further having a noise suppression means disposed between said transformer and said control circuit for suppressing generation of noise, said noise suppression means comprising:
a waveform shaping circuit connected to said primary coil;
a second diode connected to said waveform shaping circuit; and
a second switching element connected to said second diode, wherein:
said second switching element is comprised of a second MOS type field-effect transistor;
a drain of said second MOS type field-effect transistor is connected to a cathode side of said second diode, a source is connected to the circuit return path, and a gate is connected to said control circuit;
an anode of said second diode is connected to said waveform shaping circuit;
a first end of said waveform shaping circuit is connected to the second terminal of said primary coil, and the second end is connected to an anode side of said second diode;
said control circuit generates a pulse signal to control said first switching element and said second switching element in a manner to switch said second switching element into a conducting state while said first switching element is in a non-conducting state and when voltage of said primary coil is greater than voltage of said driving power supply after an electric current flows in said first diode, and into a non-conducting state while said first switching element is in a conducting state; and
said waveform shaping circuit reduces an output voltage of said primary coil to a value less than or equal to a voltage of said driving power supply at the moment said second switching element is switched on, to thereby serve as means to suppress noise.

4. The power supply circuit according to claim 3, wherein said waveform shaping circuit includes an L-C resonance circuit for outputting a shaping signal to offset fluctuation in current output from said primary coil.

5. The power supply circuit according to claim 4, wherein said L-C resonance circuit has a resonance time constant which is synchronous with respect to current fluctuations output from said primary coil.

6. The power supply circuit according to claim 3, wherein said waveform shaping circuit includes a resistance circuit for outputting a shaping wave to offset current fluctuation generated in said primary coil.

7. The power supply circuit of claim 1, wherein:
said noise suppression means disposed between said transformer and said control circuit for suppressing generation of noise includes a high-voltage detection circuit for detecting high output voltage output from said secondary coil, to obtain a detection voltage, wherein:
said control circuit controls low output voltage based on said detection voltage; and
said high-voltage detection circuit is disposed between an output point of said secondary coil and said control circuit, and includes a group of serially connected capacitors having a first detection capacitor and a second detection capacitor, a group of serially connected resistors having a first resistor and a second resistor are connected in parallel with respect to the group of serially connected capacitors, a first midpoint between said first detection capacitor and said second detection capacitor and a second midpoint between said first resistor and said second resistor are connected with a third detection capacitor, and said second midpoint is connected to said control circuit.

8. The power supply circuit of claim 2, further comprising:
an internal diode of said first switching element MOS type field-effect transistor;
a third diode disposed between the cathode of said first diode and a drain of said MOS type field-effect transistor, with a cathode thereof connected to the drain side of said MOS type field-effect transistor and an anode thereof to the cathode side of said first diode;
said first end of said capacitor is connected to a point between the cathode of said first diode and said primary coil and a point between the cathode of said first diode and the anode of said third diode; and
said first diode and said third diode having a current reverse-recovery time which is less than the internal diode current reverse-recovery of said MOS type field-effect transistor.

* * * * *